US012479623B2

(12) United States Patent
Bley et al.

(10) Patent No.: US 12,479,623 B2
(45) **Date of Patent: *Nov. 25, 2025**

(54) SHIPPING CONTAINER WITH REMOVABLE DISPLAY WINDOW

(71) Applicant: Packaging Corporation of America, Lake Forest, IL (US)

(72) Inventors: Robert W. Bley, Long Valley, NJ (US); Edward A. Hughes, Lake Hopatcong, NJ (US); Scott Miller, Trenton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,330

(22) Filed: Jul. 16, 2024

(65) Prior Publication Data

US 2024/0367849 A1 Nov. 7, 2024

Related U.S. Application Data

(63) Continuation of application No. 17/397,578, filed on Aug. 9, 2021, now Pat. No. 12,049,346.

(60) Provisional application No. 63/063,894, filed on Aug. 10, 2020.

(51) Int. Cl.

| | |
|---|---|
| ***B65D 5/54*** | (2006.01) |
| ***B31B 50/26*** | (2017.01) |
| ***B31B 50/62*** | (2017.01) |
| ***B65D 5/02*** | (2006.01) |
| *B31B 105/00* | (2017.01) |
| *B31B 110/35* | (2017.01) |
| *B31B 120/30* | (2017.01) |

(52) U.S. Cl.

CPC .............. *B65D 5/542* (2013.01); *B31B 50/26* (2017.08); *B31B 50/624* (2017.08); *B65D 5/0227* (2013.01); *B31B 2105/00* (2017.08); *B31B 2110/35* (2017.08); *B31B 2120/302* (2017.08)

(58) Field of Classification Search

CPC ........ B65D 5/542; B65D 5/0227; B65D 5/06; B65D 5/4204; B65D 5/5405; B65D 5/445; B65D 5/001; B65D 5/16; B65D 5/0281; B65D 5/3621; B65D 5/5213; A47F 5/11

USPC ....... 229/240, 103, 122.32, 166, 185.1, 919; 206/750, 774; 221/305; 312/259

See application file for complete search history.

(56) References Cited

U.S. PATENT DOCUMENTS

| | | | | |
|---|---|---|---|---|
| 5,413,276 | A | 5/1995 | Sheffer | |
| 7,607,566 | B2 * | 10/2009 | Philips .................... | B65D 5/10 229/242 |
| 8,887,985 | B2 | 11/2014 | Laughman et al. | |
| 9,022,276 | B2 | 5/2015 | Little | |
| 9,290,294 | B2 | 3/2016 | Laughman et al. | |
| 11,072,457 | B2 | 7/2021 | Gressel et al. | |
| 11,299,313 | B2 | 4/2022 | Lawrence et al. | |
| 11,396,398 | B2 | 7/2022 | Gressel et al. | |
| 11,472,595 | B1 | 10/2022 | Rhodes et al. | |

(Continued)

*Primary Examiner* — Christopher R Demeree

(74) *Attorney, Agent, or Firm* — Klarquist Sparkman, LLP

(57) ABSTRACT

A corrugated fiberboard blank and container formed therefrom includes an interior portion and an exterior portion that are combined form a doubled-wall construction, in at least some portions of the container. In certain embodiments, the interior portion is hingedly coupled to the exterior portion, and a first front side wall comprises a first removable panel, a second front side wall comprises a second removable panel, and a first top section comprises a third removable panel.

10 Claims, 29 Drawing Sheets

(56) References Cited

U.S. PATENT DOCUMENTS

| | | | | |
|---|---|---|---|---|
| 2003/0226783 | A1* | 12/2003 | Jackson | B65D 5/542 206/769 |
| 2010/0224675 | A1* | 9/2010 | Bell | B65D 5/542 229/103 |
| 2013/0206828 | A1* | 8/2013 | Schomisch | B65D 5/541 229/242 |

* cited by examiner

SHIPPING CONTAINER WITH REMOVABLE DISPLAY WINDOW

CROSS REFERENCE TO RELATED APPLICATIONS

This application is a continuation of U.S. patent application Ser. No. 17/397,578, filed Aug. 9, 2021, which claims the benefit of U.S. Provisional Application No. 63/063,894, filed Aug. 10, 2020. The prior applications are incorporated herein by reference in their entirety.

FIELD

This disclosure relates generally to containers, including containers for use as delivery and display packages, and methods of manufacturing such containers.

BACKGROUND

Containers that are capable of the dual purpose of shipping and displaying products can be advantageous. However, conventional containers of this type often suffer from structural and/or functional shortcomings. As such, improvements in such containers are desirable.

SUMMARY

The foregoing and other objects, features, and advantages of the invention will become more apparent from the following detailed description, which proceeds with reference to the accompanying figures.

DETAILED DESCRIPTION

General Considerations

Figure 1:
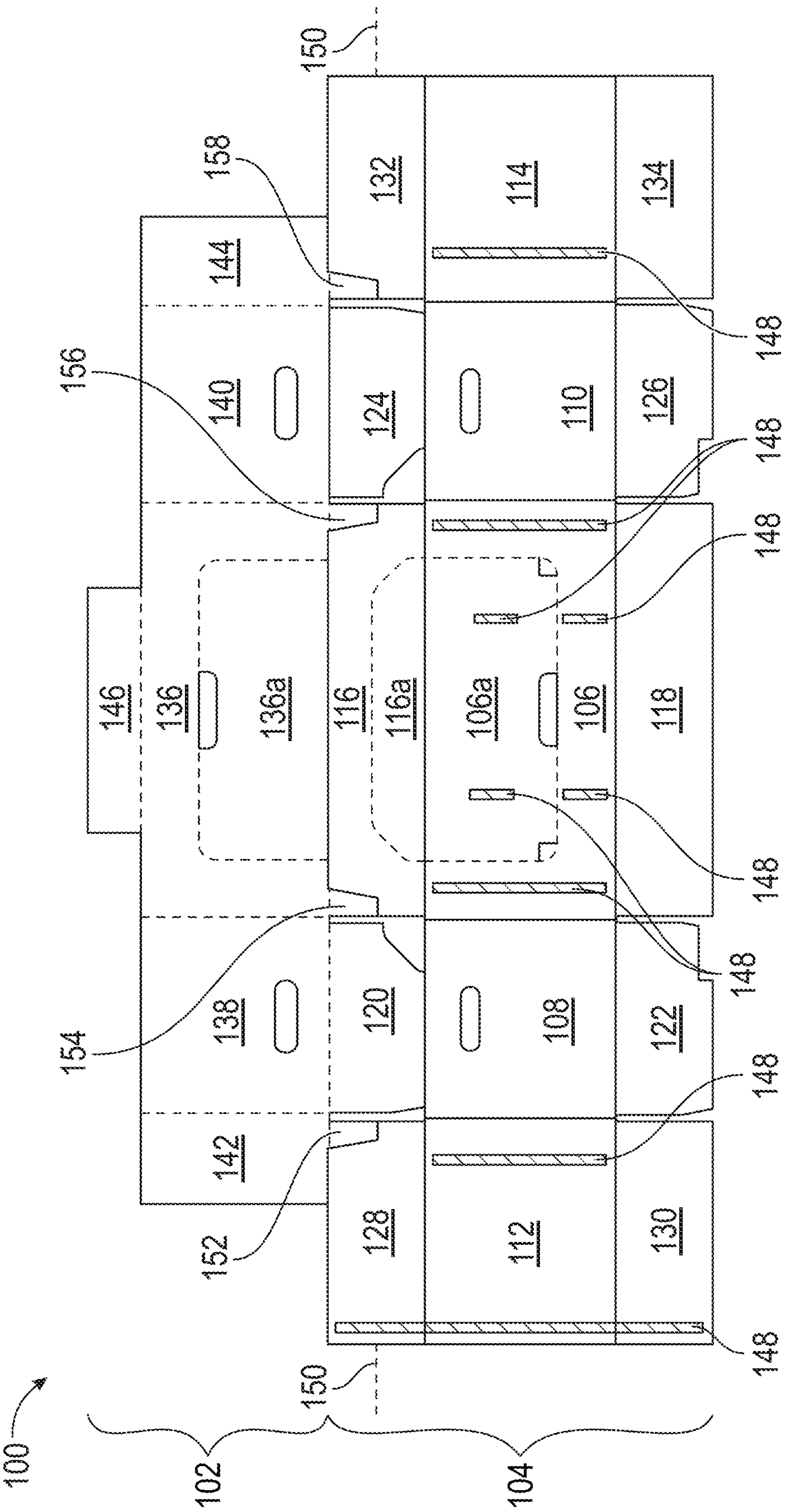
FIG. 1 illustrates a first side of an exemplary blank for constructing a container.

As used in this application the singular forms “a,” “an,” and “the” include the plural forms unless the context clearly dictates otherwise. Additionally, the term “includes” means “comprises.” Furthermore, as used herein, the term “and/or” means any one item or combination of items in the phrase. In addition, the term “exemplary” means serving as a non-limiting example, instance, or illustration. As used herein, the terms “e.g.,” and “for example,” introduce a list of one or more non-limiting embodiments, examples, instances, and/or illustrations.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like “provide,” “produce,” “determine,” and “select” to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

As used herein, the term “container” refers to an article that is capable of holding one or more products or other physical articles. As used herein, the term “corrugated paperboard box" refers to a box formed from any of a variety of heavy paper-like materials, including, for example, card-stock, corrugated fiberboard, and/or paperboard.

As used herein, the term "blank" refers to a flat sheet of material that is formed into a container, such as a flat sheet of corrugated paperboard. As used herein, "corrugated fiber-board" refers to a material having a fluted corrugated sheet and one or two flat linerboards. The linerboards described herein can be made of a variety of materials and can have any desirable color or construction. For example, lin-erboards can have, without limitation and in whole or in part, a construction that includes an inside and/or outside face that is white, kraft, mottled, colored, and/or preprinted with a graphic or other desired surface ornamentation.

As used herein, the term "flat-formed" refers to an article that is manufactured from one or more flat pieces, such as a blank, that are manipulated into a different shape, such as by folding. As used herein, the term "hingedly coupled" refers to any manner of engagement between a first part of a blank relative to a second part of the blank which allows the first part to travel relative to the second part, such as by one or more fold lines, one or more cut lines, and/or some combi-nation thereof. In some embodiments, the first part does not fully disengage from the second part during construction of the container. In other embodiments, the first part can be fully disengaged (i.e., separated) from the second part during construction of the container.

As used herein, the term "fold lines" refers to any creasing, perforations, or the like that facilitates folding of a wall or other portion of a blank, including, for example, one or more perforations, slit-scores, slit/crease combinations, curved scores, wide-crush zones, embossing, and/or any combination of the same.

As used herein, the term "cut line" refers to type of fold line in which an area that includes a cut that extends at least partially through the blank to facilitate folding, tearing, and/or some other structural advantage. Cut lines can be straight, curved, or some other shape, and can include perforation lines in which the cut is not continuous along the length of the cut line (i.e., a perforated line is a cut line that is discontinuous).

As used herein, the terms "graphic" and "graphical ele-ment" refer to any visual design elements including, but not limited to, photos, logos, text, illustrations, instructions, advertisements, lines, shapes, patterns, and/or images of various kinds, as well as any combinations of these ele-ments. The terms graphic and graphical element are not intended to be limiting and can incorporate any number of contiguous or non-contiguous visual features. A graphic can be applied to a surface of a material, such as a blank, in any suitable manner. For example, a graphic can be provided on a surface by printing, lamination, adhesive application, coating application (e.g., paint), embossing, and/or any other means.

For the purposes of this disclosure, relative terms such as "vertical", "horizontal", "top", "bottom", "front", "back", "end" and "sides" may be used. It should be understood, however, that the terms are used only for purposes of description, and are not intended to be used as limitations. Accordingly, the orientation of an object or a combination of objects may change without altering the scope of the inven-tion.

As used herein the term "KDF" or "KDF blank" refers to a knocked-down flat blank, which is a flat condition in which the box is generally shipped for use, prior to forming a box from the blank.

Exemplary Containers and Methods of Constructing the Same

FIG. 1 illustrates an exemplary embodiment of a blank 100 that can be formed into a container, such as a corrugated paperboard box. FIG. 1 illustrates a first side of the blank (i.e., a top side), with the second side (i.e., a bottom side) facing down. An interior portion 102 of the blank 100 is configured to form a least a portion of interior wall structure of the container and exterior portion 104 is configured to form an exterior wall structure.

Referring to FIG. 1, exterior portion 104 comprises a plurality of interconnected wall panels, including front side wall 106, right side wall 108, left side wall 110, and first rear side wall 112 and second rear side wall 114. Front side wall 106 includes a removable front panel 106*a*.

As discussed above, the directions front, right, and rear and relative and, in this embodiment used in reference to a fully formed container. Since FIG. 1 discloses an inside view of the exterior portion 104, it should be understood that the relative terms right and left are reversed.

Front side wall 106, right side wall 108, left side wall 110, and first rear side wall 112 and second rear side wall 114 can be folded at the indicated fold lines to form an enclosure, along with a top and bottom wall closure.

The top wall closure can be formed, collectively, by the folding of front side top wall 116, right side top wall 120, left side top wall 124, and first rear side top wall 128 and second rear side top wall 132.

The bottom wall closure can be formed, collectively, by the folding of front side bottom wall 118, right side bottom wall 122, left side bottom wall 126, and first rear side bottom wall 130 and second rear side bottom wall 134.

As shown in FIG. 1, the front side top wall 116 can include a removable top panel 116*a*, which can be coupled to removable panel 106*a*, with a fold line therebetween.

Interior portion 102 comprises a plurality of intercon-nected wall panels, including front side wall 136, right side wall 138, left side wall 140, and first rear side wall 142 and second rear side wall 144. Front side wall 136 includes a removable front panel 136*a*. Interior portion 102 can further comprise an interior bottom wall portion 146 that extends from front side wall 136.

As shown in more detail in FIGS. 2-5, the right side top wall 120 and left side top wall 124 are connected to the interior support structure and can be folded under the front and back side top walls 116, 128, 132 during construction of the container.

A plurality of adhesive portions can be applied to an interior area of the exterior portion 104, as shown in FIG. 1. For example, glue lines can be applied to front side wall 106 (including portion 106*a*), first rear side wall 112 and second rear side wall 114. These glue lines can be positioned to engage with a surface of the interior portion 102 when it is folded about fold line 150. Interior portion 102 can be coupled to exterior portion 104 through interconnecting legs 152, 154, 156, and 158.

Additional adhesive portions, including the additional glue lines illustrated in FIG. 1, can be provided to secure other portions of the exterior portion 104 to itself and/or the interior portion 102 when formed into the container.

Figure 2:
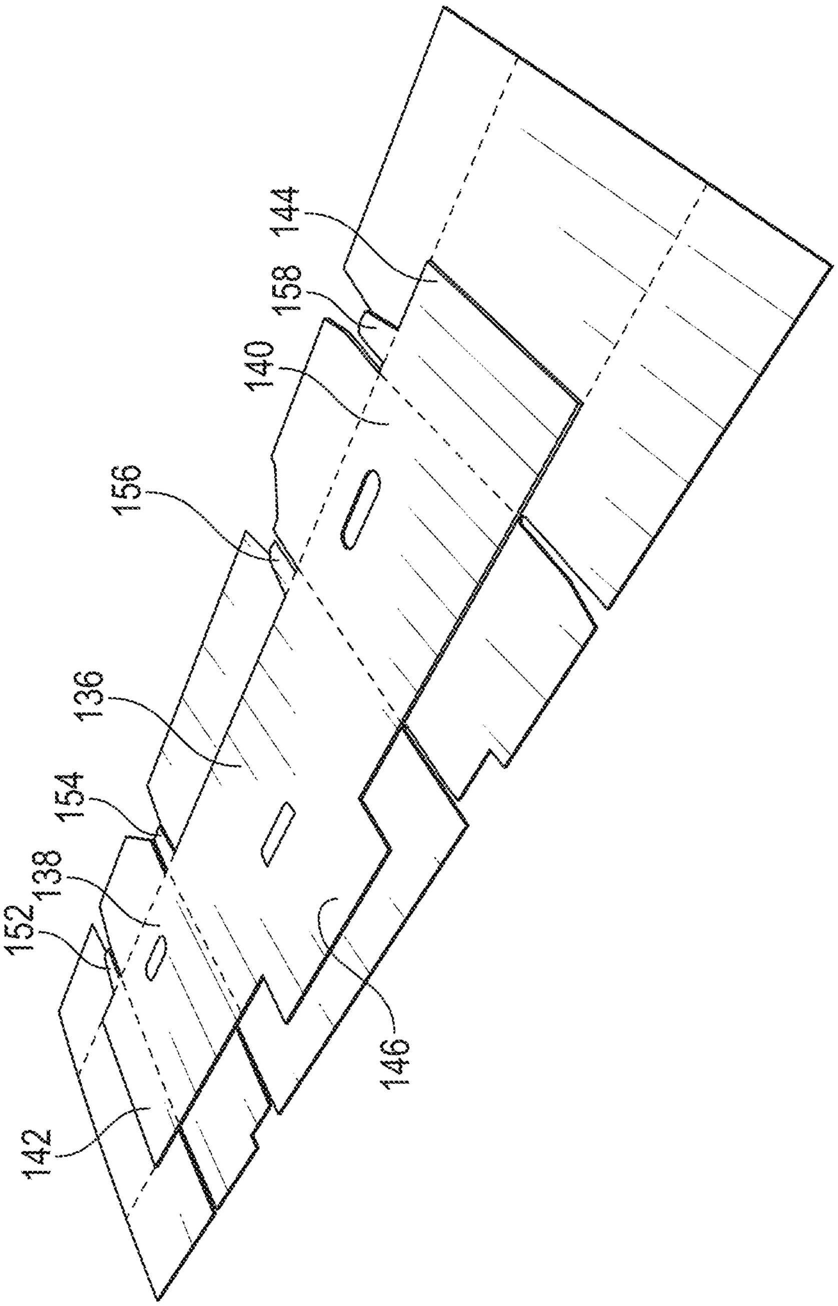
FIG. 2 illustrates an exemplary blank that has been formed by folding and adhering an interior portion to an exterior portion to form a double-wall construction in at least some portions of the blank.

As shown in FIG. 2, the interior portion 102 can be folded about fold line 150 and a surface of interior portion 102 can be secured to a facing surface of exterior portion 104 at the glue lines discussed above.

Thus, as shown in FIG. 2, the interior portion 102 forms a second, adjacent wall structure that, in combination with the exterior side wall structures (front side wall 106, right side wall 108, left side wall 110, and first rear side wall 112 and second rear side wall 114) forms a more rigid side wall structure than either the interior portion 102 or the exterior portion 104 can provide alone.

As discussed in more detail below with regard to converting the constructed box (e.g., a shipping box) into a display box, the interior portion 102 is folded over the exterior portion 104 so that the removeable panel 106*a* of front side wall 106 is aligned with the removable panel 136*a* of front side wall 136.

Figure 3:
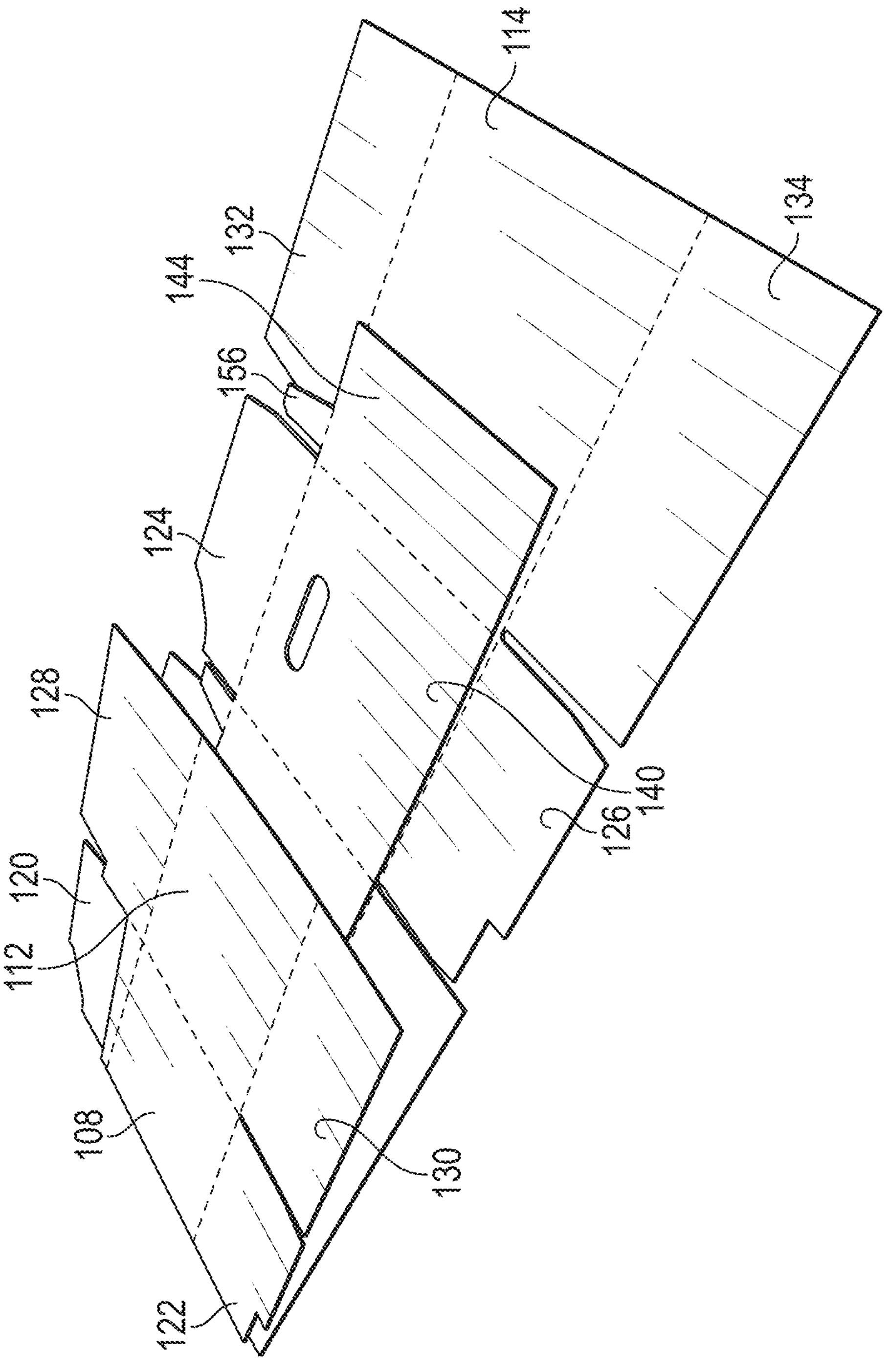
FIG. 3 illustrates an exemplary blank further folded in an intermediate stage of constructing a KDF blank.

Referring to FIG. 3, once the interior portion 102 is secured to the exterior portion 104, additional folds can be made to form a more compact shipping configuration (e.g., a flat KDF blank).

Figure 4:
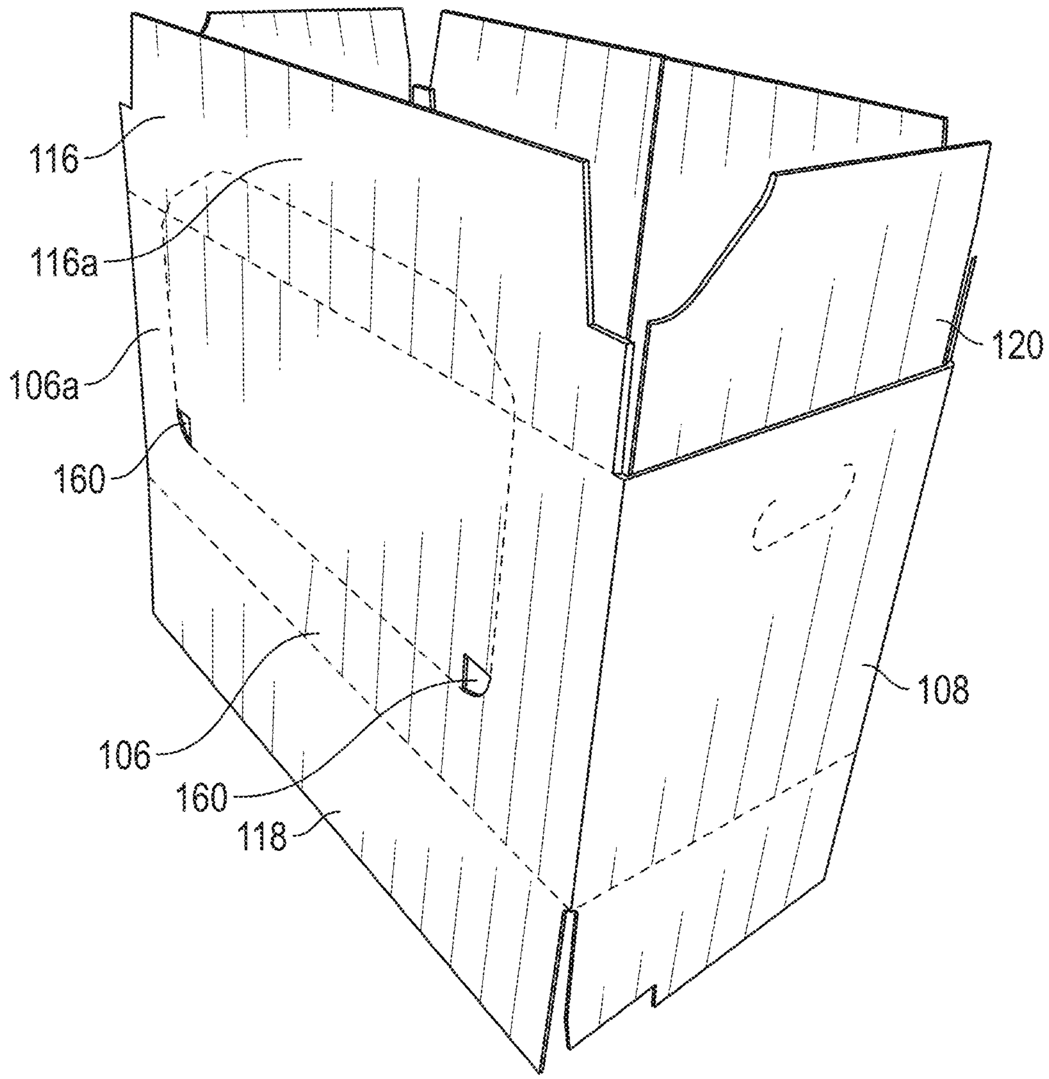
FIG. 4 illustrates an exemplary blank in an intermediate stage of constructing the blank into a container.

FIG. 4 illustrates the container in an intermediate state as it is being formed from a KDF blank. As shown in FIG. 4, the interior portion 102 is within the exterior portion 104 and forms a double wall structure at the overlapping regions.

Referring to FIG. 4, removable portion 106*a* can comprise one or more cutouts 160 to facilitate removal of removable portion 106*a* and 116*a*, as well as the corresponding wall portions of interior portion 102 which are directly behind 106*a* (e.g., 136*a*).

Figure 5:
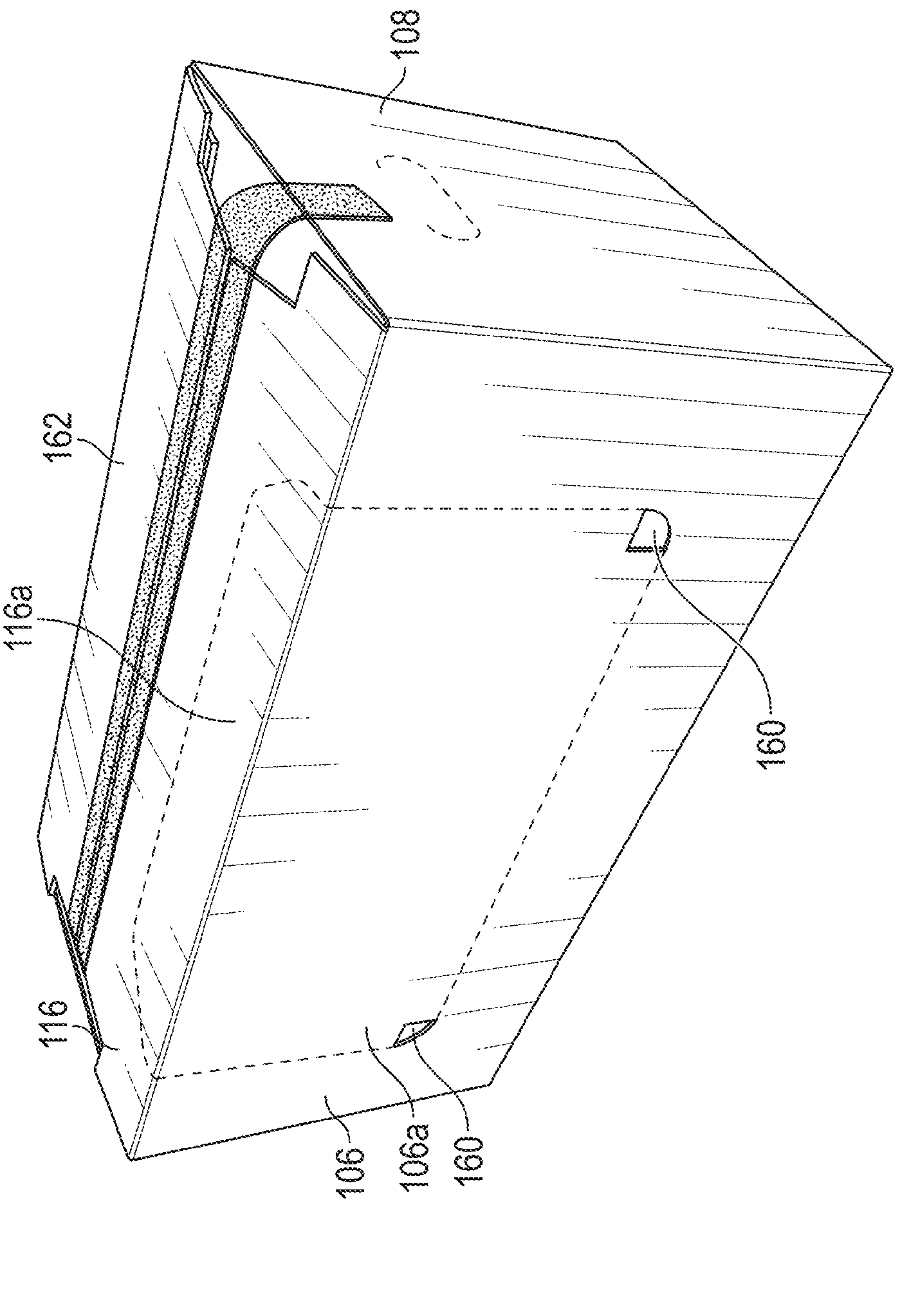
FIG. 5 illustrates an exemplary container formed from a blank.

FIG. 5 illustrates the container formed by blank 100. As shown in FIG. 5, tape 162 can be used to secure one or more wall portions of the container. Additional securing means including fasteners, adhesive strips, glue, etc., can also be used to secure portions of the container at other locations, including to secure the first and second top/bottom side wall members together in a closed manner.

Figure 6:
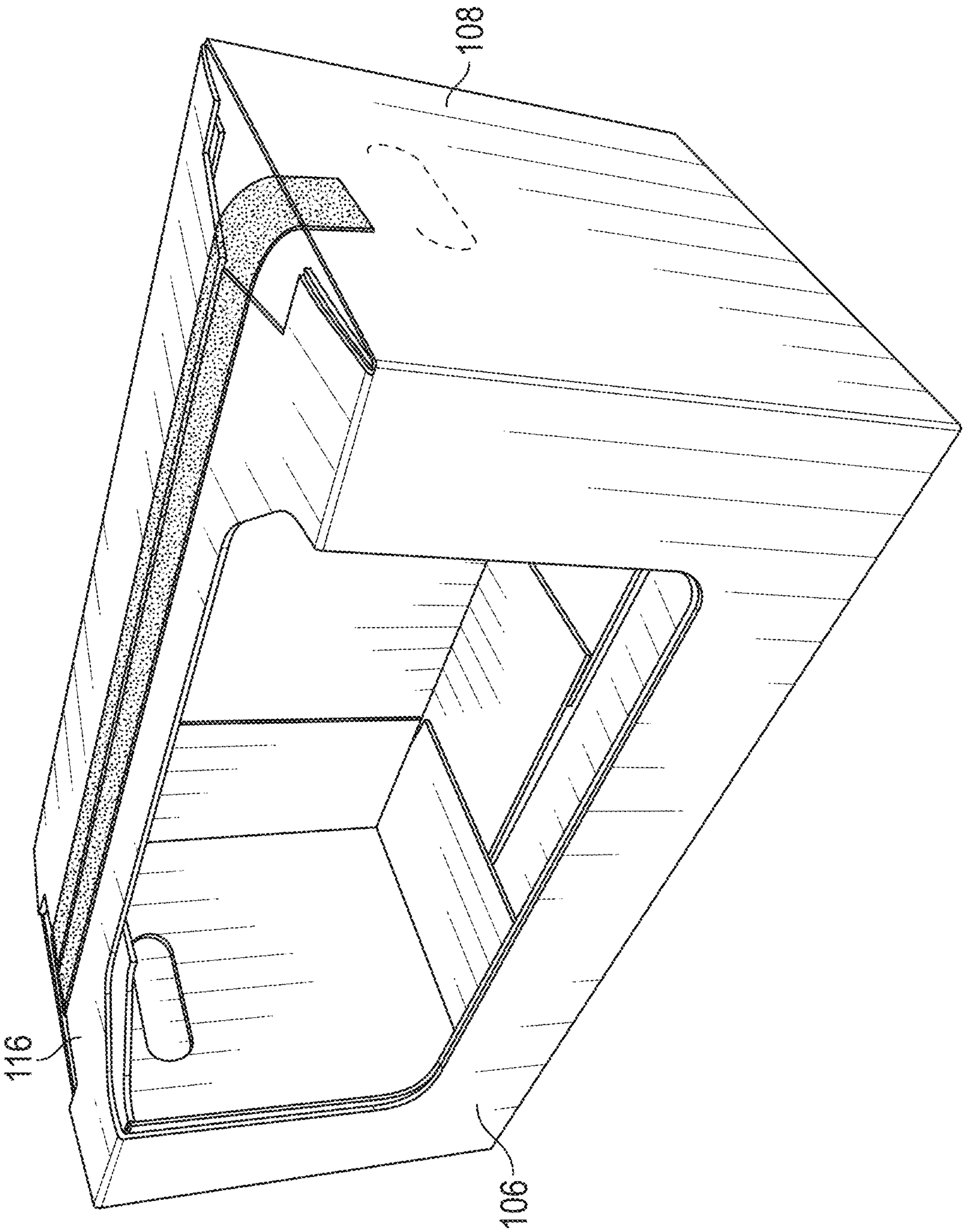
FIG. 6 illustrates the exemplary container of FIG. 5 after the removal of a plurality of removable panels.

FIG. 6 illustrates the container of FIG. 5 converted to a display box by removing removable panels 106*a* and 116*a*, as well as the removable panel 136*a* of the interior portion 102, creating an opening that extends from the front wall structure to the top wall structure.

Figure 7:
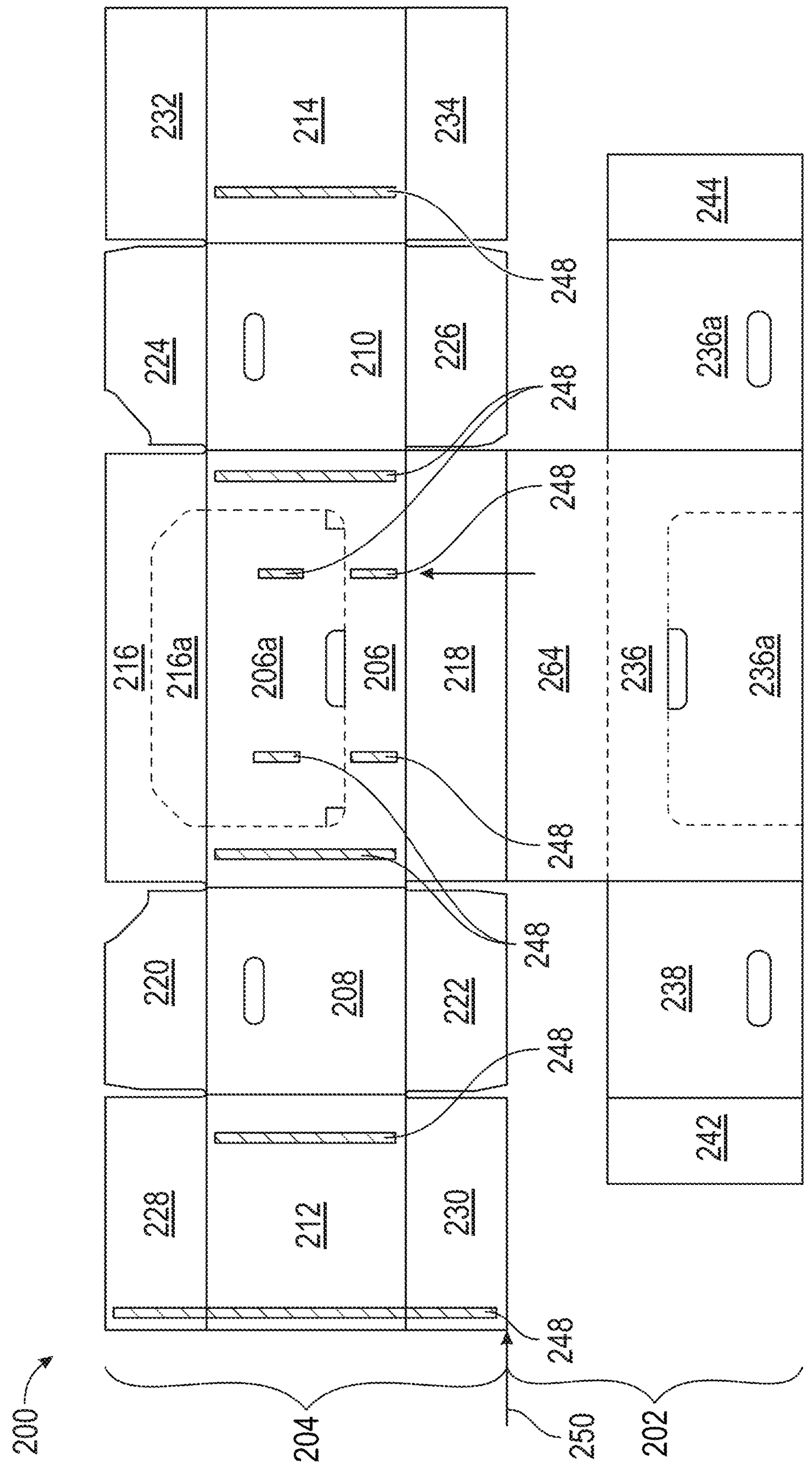
FIG. 7 illustrates a first side of an exemplary blank for constructing a container.

FIG. 7 illustrates another embodiment of an exemplary blank 200 that can be formed into a container, such as a corrugated paperboard box. FIG. 7 illustrates a first side of the blank (i.e., a top side), with the second side (i.e., a bottom side) facing down. An interior portion 202 of the blank 200 is configured to form a least a portion of interior wall structure of the container and exterior portion 204 is configured to form an exterior wall structure.

Referring to FIG. 7, exterior portion 204 comprises a plurality of interconnected wall panels, including front side wall 206, right side wall 208, left side wall 210, and first rear side wall 212 and second rear side wall 214. Front side wall 206 includes a removable front panel 206*a*.

Front side wall 206, right side wall 208, left side wall 210, and first rear side wall 212 and second rear side wall 214 can be folded at the indicated fold lines to form an enclosure, along with a top and bottom wall closure. The top wall closure can be formed, collectively, by the folding of front side top wall 216, right side top wall 220, left side top wall 224, and first rear side top wall 228 and second rear side top wall 232. The bottom wall closure can be formed, collectively, by the folding of front side bottom wall 218, right side bottom wall 222, left side bottom wall 226, and first rear side bottom wall 230 and second rear side bottom wall 234.

As shown in FIG. 7, the front side top wall 216 can include a removable top panel 216*a*, which can be coupled to removable panel 206*a*, with a fold line therebetween. Interior portion 202 comprises a plurality of interconnected wall panels, including front side wall 236, right side wall 238, left side wall 240, and first rear side wall 242 and second rear side wall 244. Front side wall 236 includes a removable front panel 236*a*.

A plurality of adhesive portions can be applied to an interior area of the exterior portion 204, as shown in FIG. 7. For example, glue lines can be applied to front side wall 206 (including portion 206*a*), first rear side wall 212 and second rear side wall 214. These glue lines can be positioned to engage with a surface of the interior portion 202 when it is folded about fold line 250. As shown in FIG. 7, there are no connecting legs, instead interior portion 202 is coupled to exterior portion 202 through connecting wall 264, which when folded, as discussed below, aligns with front side bottom wall 218.

Additional adhesive portions, including the additional glue lines illustrated in FIG. 7, can be provided to secure other portions of the exterior portion 104 to itself and/or the interior portion 102 when formed into the container.

Figure 8:
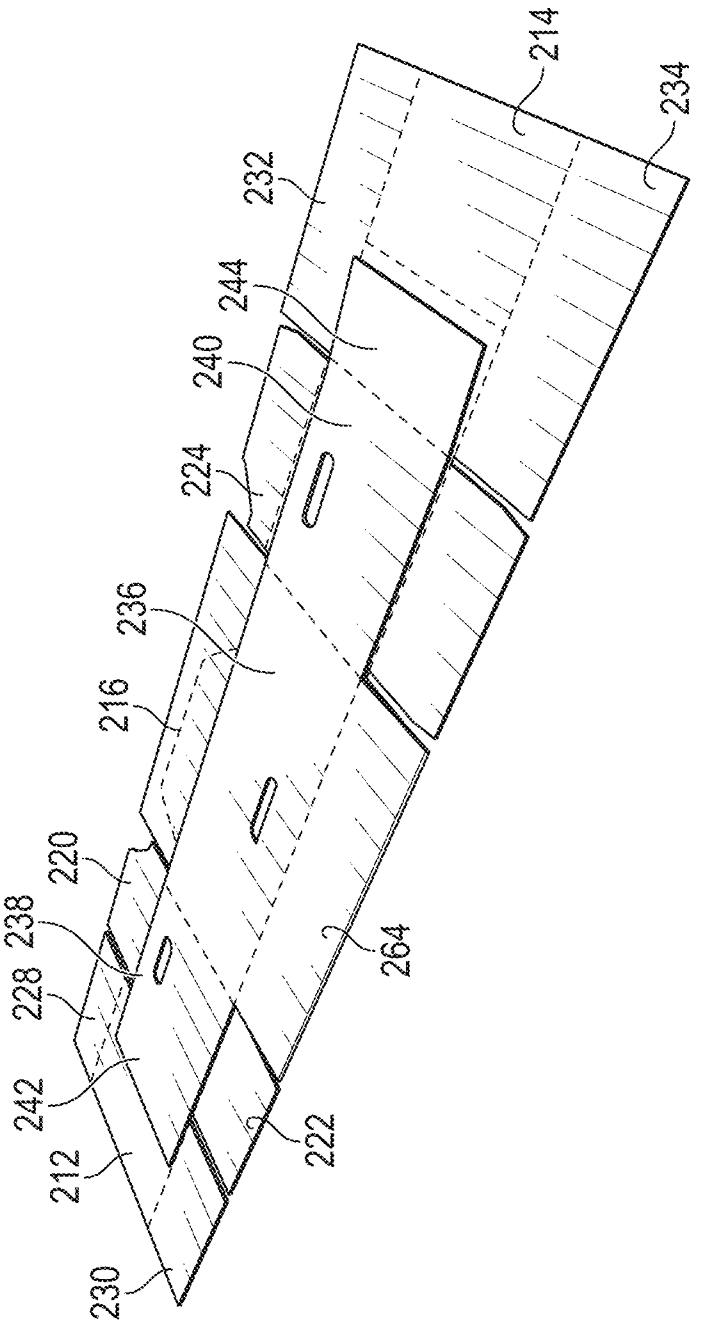
FIG. 8 illustrates an exemplary blank that has been formed by folding and adhering an interior portion to an exterior portion to form a double-wall construction in at least some portions of the blank.

As shown in FIG. 8, the interior portion 202 can be folded about fold line 250 and a surface of interior portion 202 can be secured to a facing surface of exterior portion 204 at the glue lines discussed above.

Thus, as shown in FIG. 8, the interior portion 202 forms a second, adjacent wall structure that, in combination with the exterior side wall structures (front side wall 206, right side wall 208, left side wall 210, and first rear side wall 212 and second rear side wall 214) forms a more rigid side wall structure than either the interior portion 202 or the exterior portion 204 can provide alone.

Figure 9:
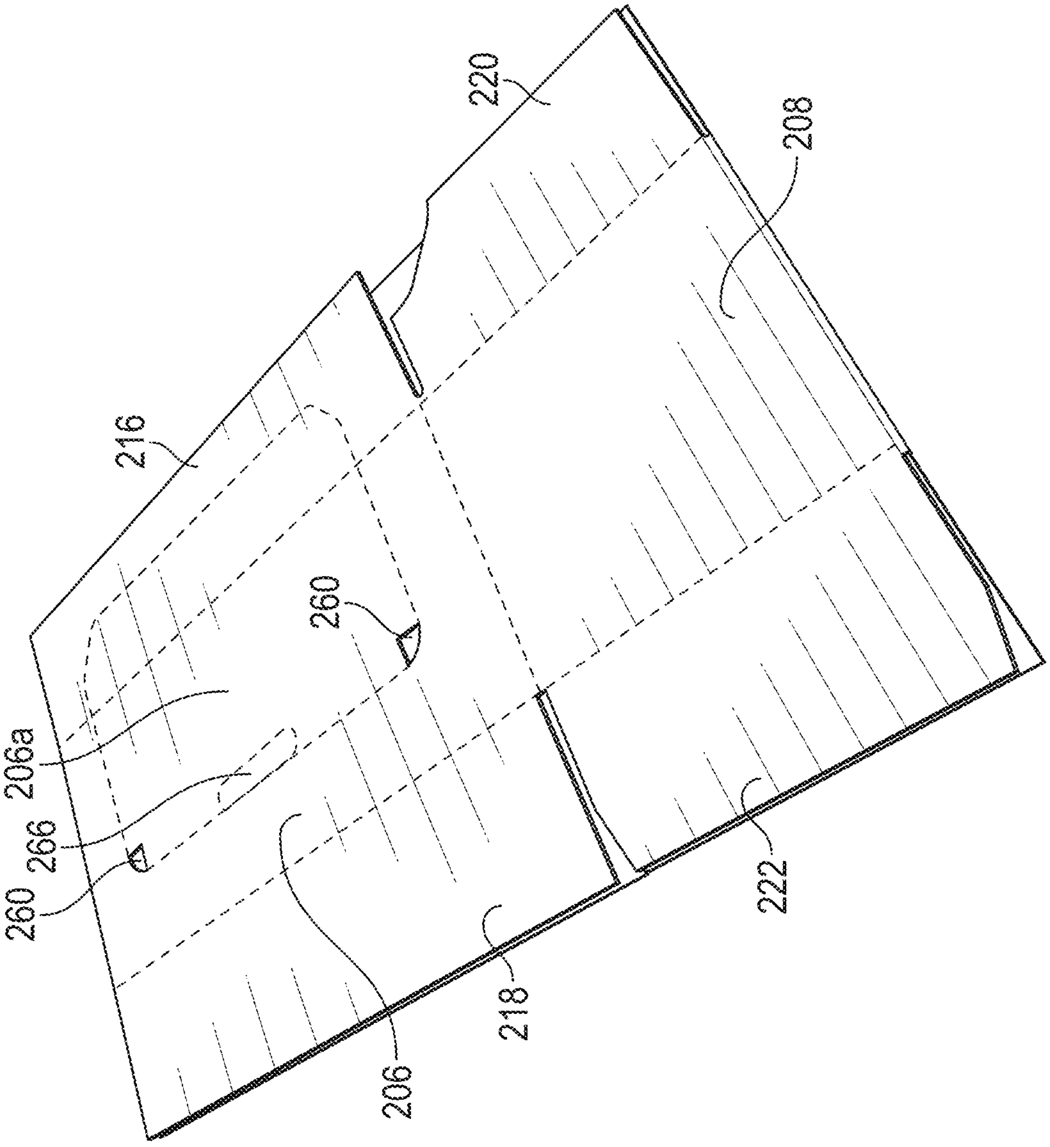
FIG. 9 illustrates an exemplary blank that has been formed by folding and adhering an interior portion to an exterior portion to form a double-wall construction in at least some portions of the blank, and folded to construct a KDF blank.

As shown in FIG. 9, the interior portion 202 can be folded about fold line 250 and a surface of interior portion 202 can be secured to a facing surface of exterior portion 204 at the glue lines discussed above, and the resulting structure can be folded into a KDF blank. To facilitate removal of the removable panel 106*a*, a secondary cutout 266 can be provided on panel 106*a*. The secondary cutout 266 can be scored for removal or partially scored and provided with one or more fold lines if desired.

As with the embodiment shown in FIG. 1, the interior portion 202 forms a second, adjacent wall structure that, in combination with the exterior side wall structures (front side wall 206, right side wall 208, left side wall 210, and first rear side wall 212 and second rear side wall 214) forms a more rigid side wall structure than either the interior portion 202 or the exterior portion 204 can provide alone.

As discussed in more detail below with regard to converting the constructed box (e.g., a shipping box) into a display box, the interior portion 202 is folded over the exterior portion 204 so that the removeable panel 206*a* of front side wall 206 is aligned with the removable panel 236*a* of front side wall 236.

Figure 10:
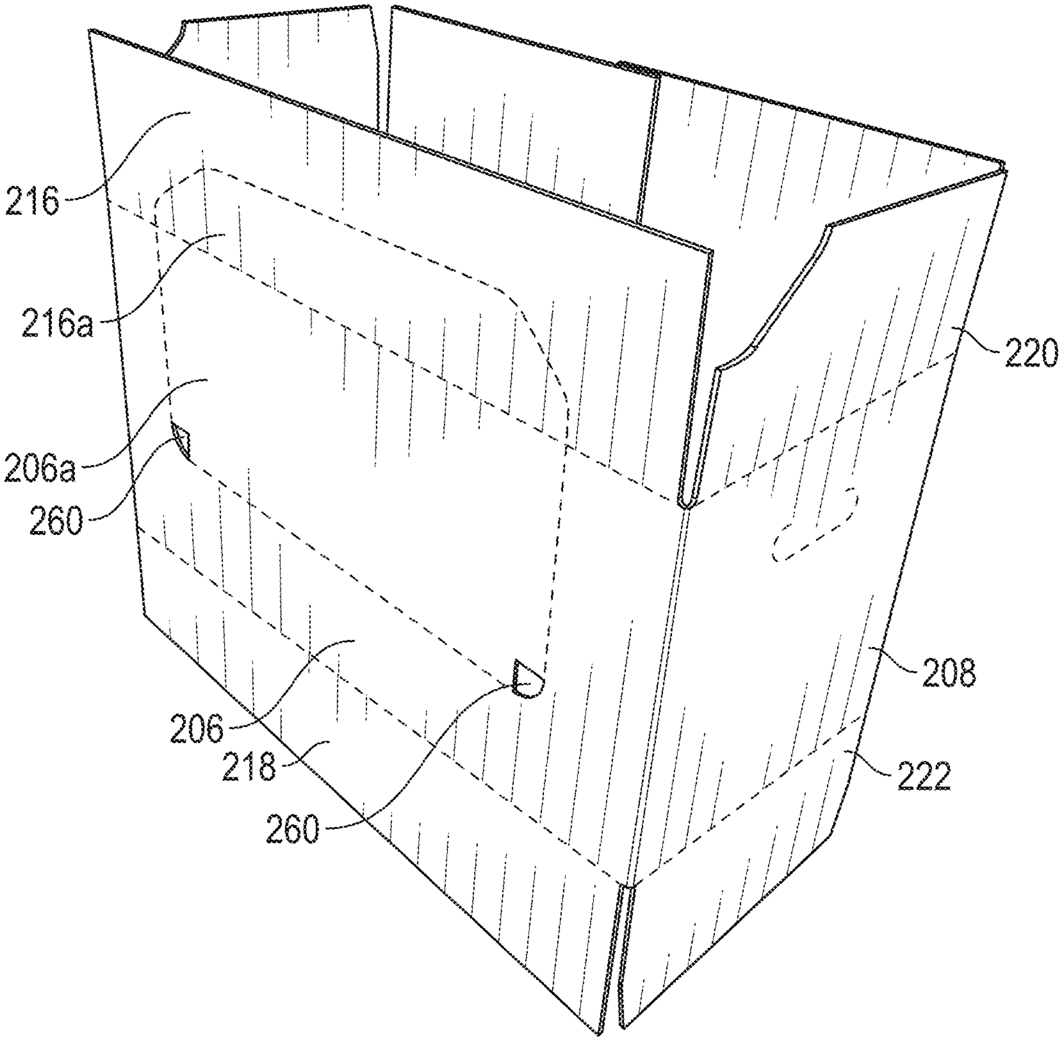
FIG. 10 illustrates an exemplary blank in an intermediate stage of constructing the blank into a container.

FIG. 10 illustrates the container in an intermediate state as it is being formed from a KDF blank, with the interior portion 202 folded and secured to the exterior portion 204 at an interior surface thereof, thereby forming a double wall structure at the overlapping regions.

Referring to FIG. 10, removable portion 206*a* can comprise one or more cutouts 260 to facilitate removal of removable portion 206*a* and 216*a*, as well as the corresponding wall portions of interior portion 202 which are directly behind 206*a* (e.g., 236*a*).

Figure 11:
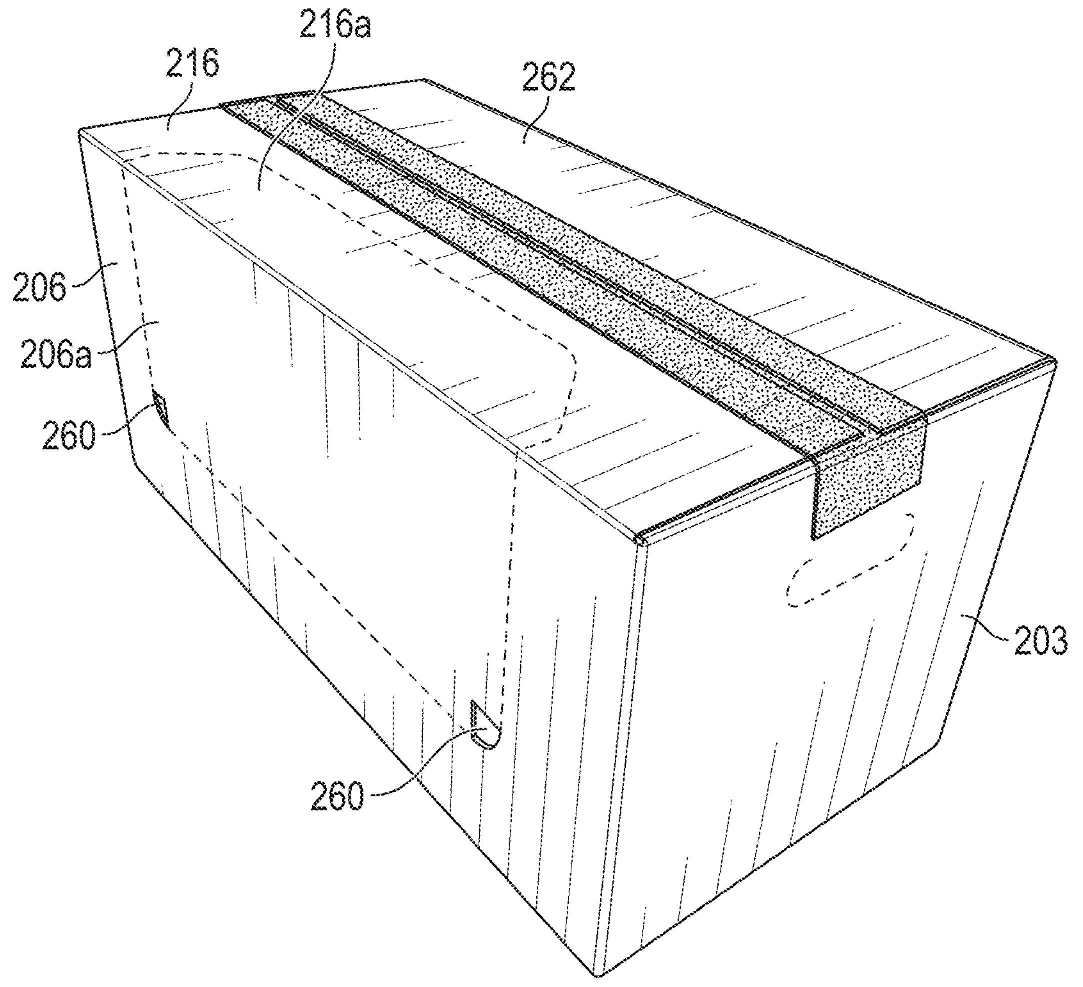
FIG. 11 illustrates an exemplary container formed from a blank.

FIG. 11 illustrates the container formed by blank 200. As shown in FIG. 11, tape 262 can be used to secure one or more wall portions of the container. Additional securing means including fasteners, adhesive strips, glue, etc., can also be used to secure portions of the container at other locations, including to secure the first and second top/bottom side wall members together in a closed manner.

Figure 12:
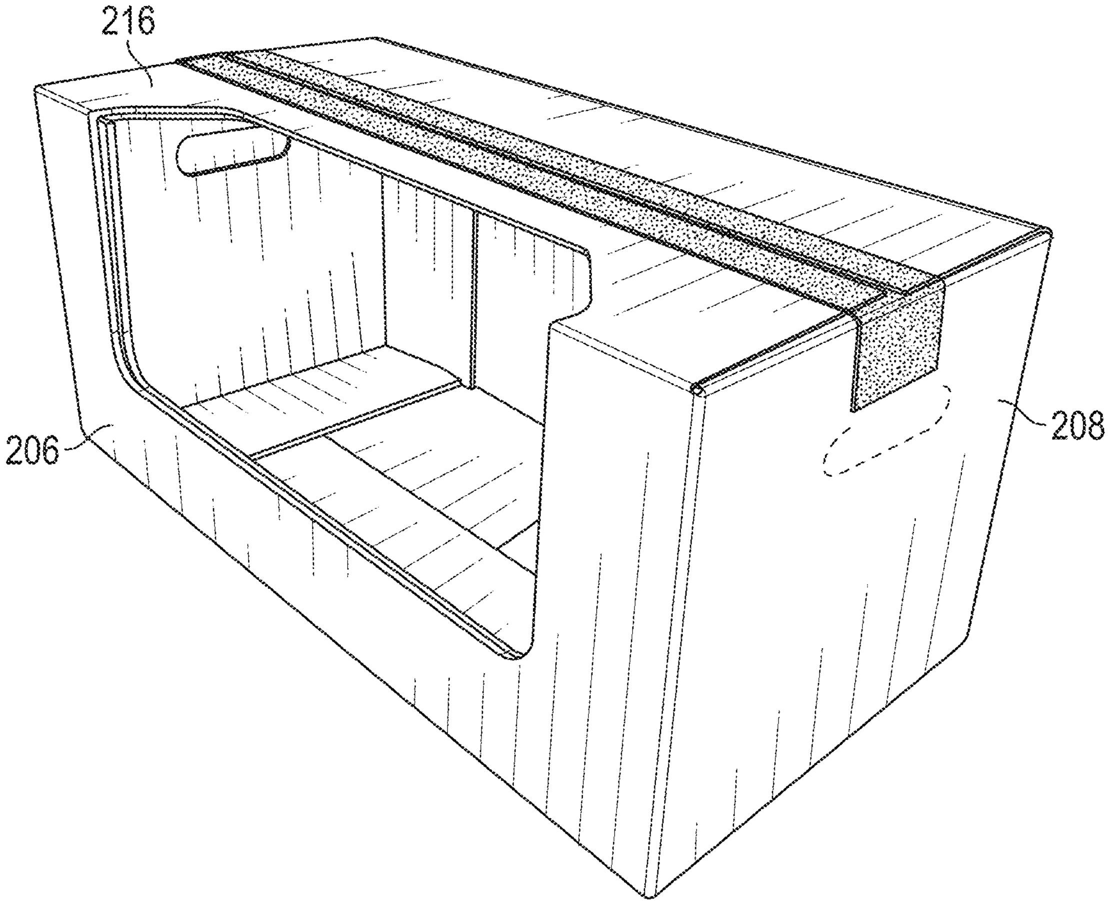
FIG. 12 illustrates the exemplary container of FIG. 11 after the removal of a plurality of removable panels.

FIG. 12 illustrates the container of FIG. 11 converted to a display box by removing removable panels 206*a* and 216*a*, as well as the removable panel 236*a* of the interior portion 202, creating an opening that extends from the front wall structure to the top wall structure.

Figure 13:
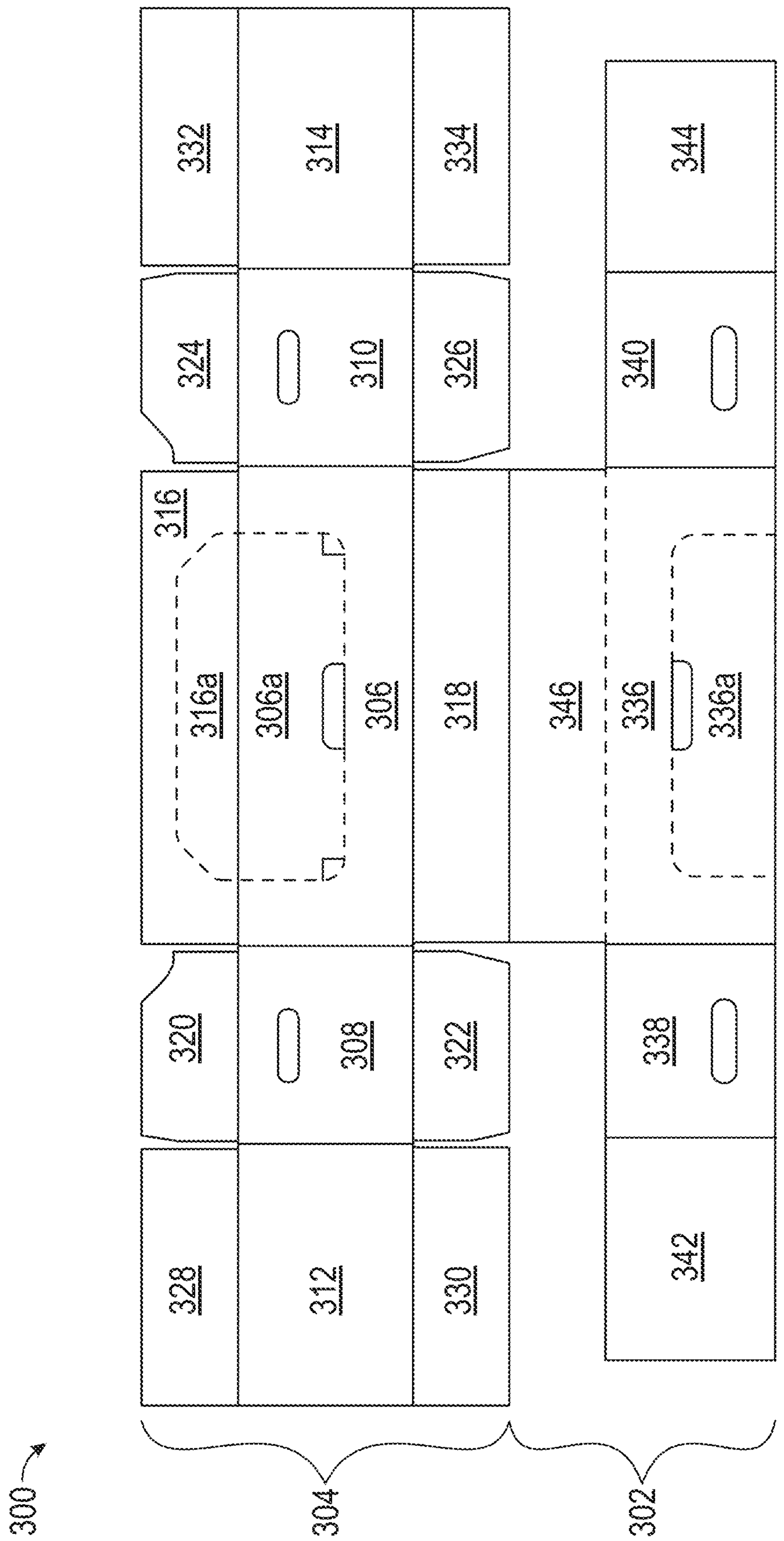
FIG. 13 illustrates a first side of an exemplary blank for constructing a container.

FIG. 13 illustrates another exemplary embodiment of a blank 300 that can be formed into a container. FIG. 1 illustrates a first side of the blank (i.e., a top side), with the second side (i.e., a bottom side) facing down. An interior portion 302 of the blank 300 is configured to form a least a portion of interior wall structure of the container and exterior portion 304 is configured to form an exterior wall structure.

Referring to FIG. 13, exterior portion 304 comprises a plurality of interconnected wall panels, including front side wall 306, right side wall 308, left side wall 310, and first rear side wall 312 and second rear side wall 314. Front side wall 306 includes a removable front panel 306*a*.

As discussed above, the directions front, right, and rear and relative and, in this embodiment used in reference to a fully formed container. Since FIG. 13 discloses an inside view of the exterior portion 304, it should be understood that the relative terms right and left may be reversed.

Front side wall 306, right side wall 308, left side wall 310, and first rear side wall 312 and second rear side wall 314 can be folded at the indicated fold lines to form an enclosure, along with a top and bottom wall closure. The top wall closure can be formed, collectively, by the folding of front side top wall 316, right side top wall 320, left side top wall 324, and first rear side top wall 328 and second rear side top wall 332. The bottom wall closure can be formed, collectively, by the folding of front side bottom wall 318, right side bottom wall 322, left side bottom wall 326, and first rear side bottom wall 330 and second rear side bottom wall 334.

As shown in FIG. 13, the front side top wall 316 can include a removable top panel 316*a*, which can be coupled to removable panel 306*a*, with a fold line therebetween. Interior portion 302 comprises a plurality of interconnected wall panels, including front side wall 336, right side wall 338, left side wall 340, and first rear side wall 342 and second rear side wall 344. Front side wall 336 includes a removable front panel 336*a*. Interior portion 302 can further comprise an interior bottom wall portion 346 that extends from front side bottom wall 318.

Figure 14A:
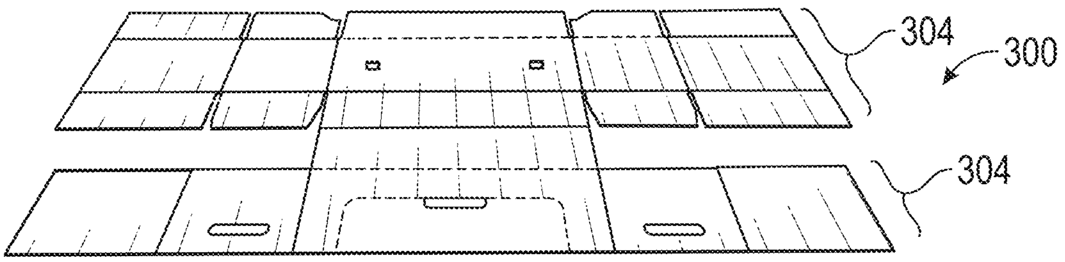
FIGS. 14A-F illustrate various stages of construction of the exemplary blank of FIG. 13 which is formed by folding and adhering an interior portion to an exterior portion to form a double-wall construction in at least some portions of the blank.
Figure 14B:
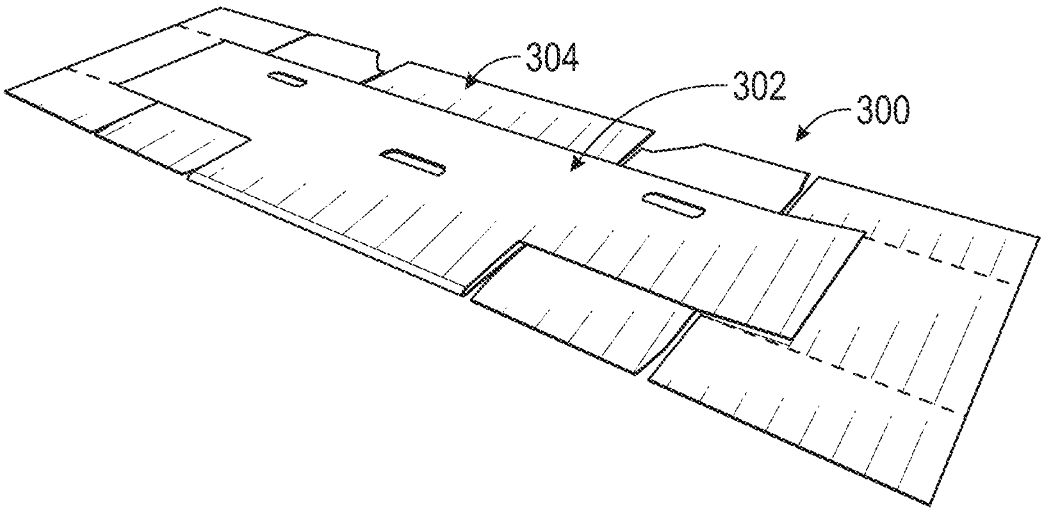

FIG. 14A shows another view of the blank 300 and FIG. 14B shows the interior portion 302 folded onto the exterior portion 304 during construction of the container. One or more adhesive portions can be applied to the interior portion and/or exterior portion to secure the interior portion to the exterior portion (see, e.g., blank 100 of FIG. 1). For example, glue lines can be applied to front side wall 306 (including portion 306*a*), first rear side wall 312 and second rear side wall 314. These glue lines can be positioned to engage with a surface of the interior portion 302 when it is folded about the fold line of the two portions.

Additional adhesive portions, such as glue lines, can be provided to secure other portions of the exterior portion 304 to itself and/or the interior portion 302 when formed into the container.

As shown in FIG. 14B, the interior portion 302 can be folded about a main fold line and a surface of interior portion 302 can be secured to a facing surface of exterior portion 304 (e.g., with glue lines as discussed above). Thus, as shown in FIG. 14B, the interior portion 302 forms a second, adjacent wall structure that, in combination with the exterior side wall structures (front side wall 306, right side wall 308, left side wall 310, and first rear side wall 312 and second rear side wall 314) forms a more rigid side wall structure than either the interior portion 302 or the exterior portion 304 can provide alone.

As discussed in more detail below with regard to converting the constructed box (e.g., a shipping box) into a display box, the interior portion 302 is folded over the exterior portion 304 so that the removeable panel 306*a* of front side wall 306 is aligned with the removable panel 336*a* of front side wall 336.

Figure 14C:
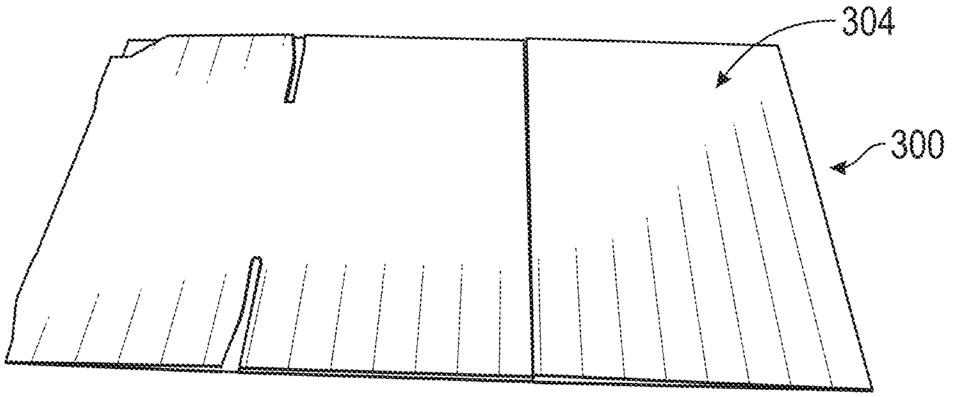

Referring to FIG. 14C, once the interior portion 302 is secured to the exterior portion 304, additional folds can be made to form a more compact shipping configuration (e.g., a flat KDF blank).

Figure 14D:
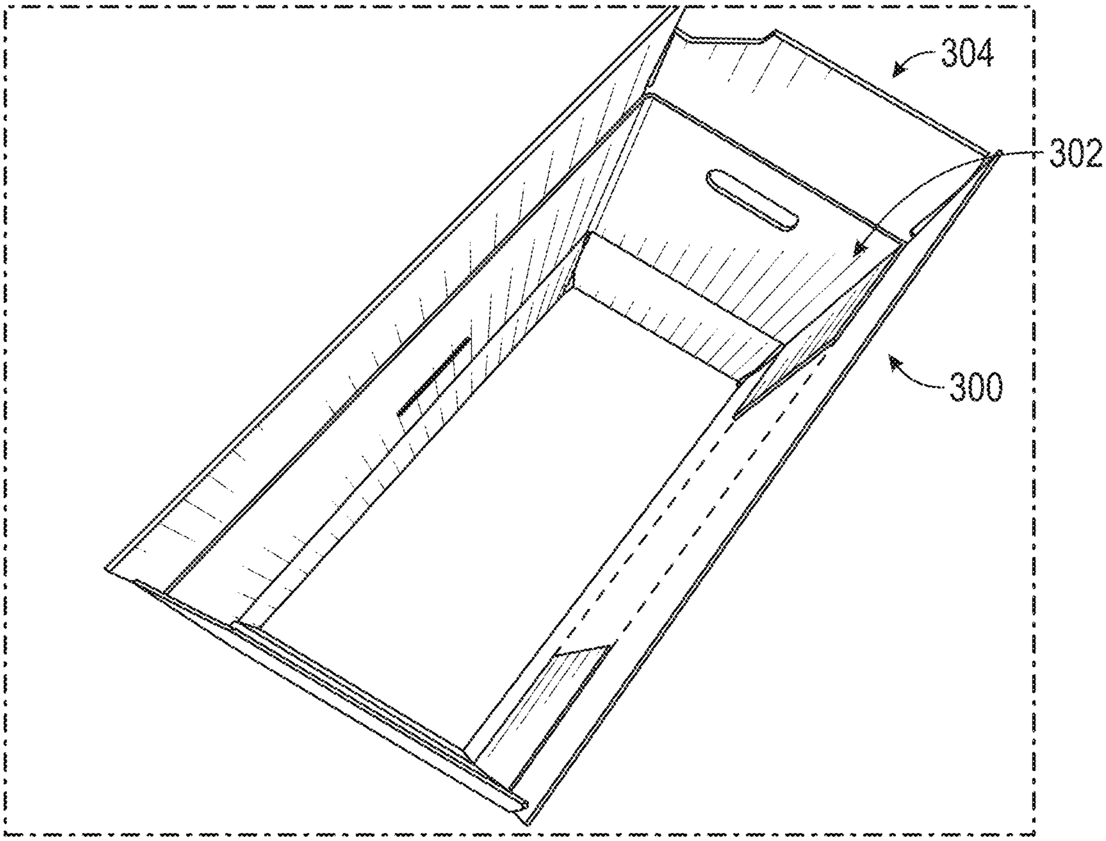

FIG. 14D illustrates the container in an intermediate state as it is being formed from a KDF blank to the container. As shown in FIG. 14D, the interior portion 302 is within the exterior portion 304 and forms a double wall structure at the overlapping regions.

Figure 14E:
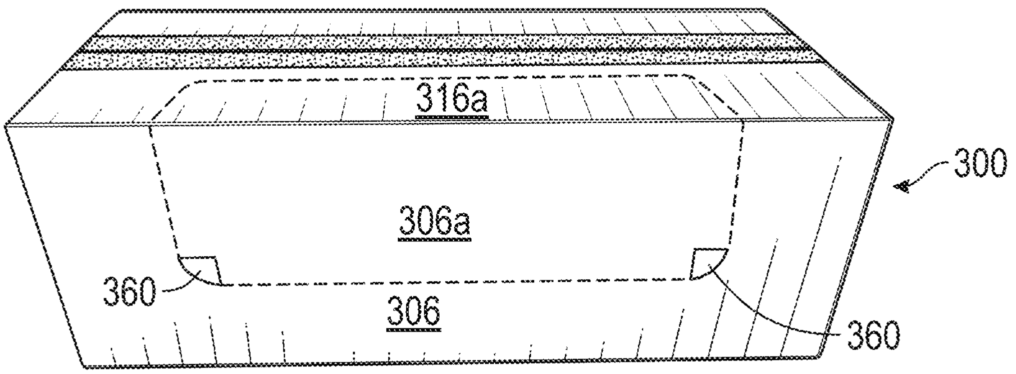
Figure 14F:
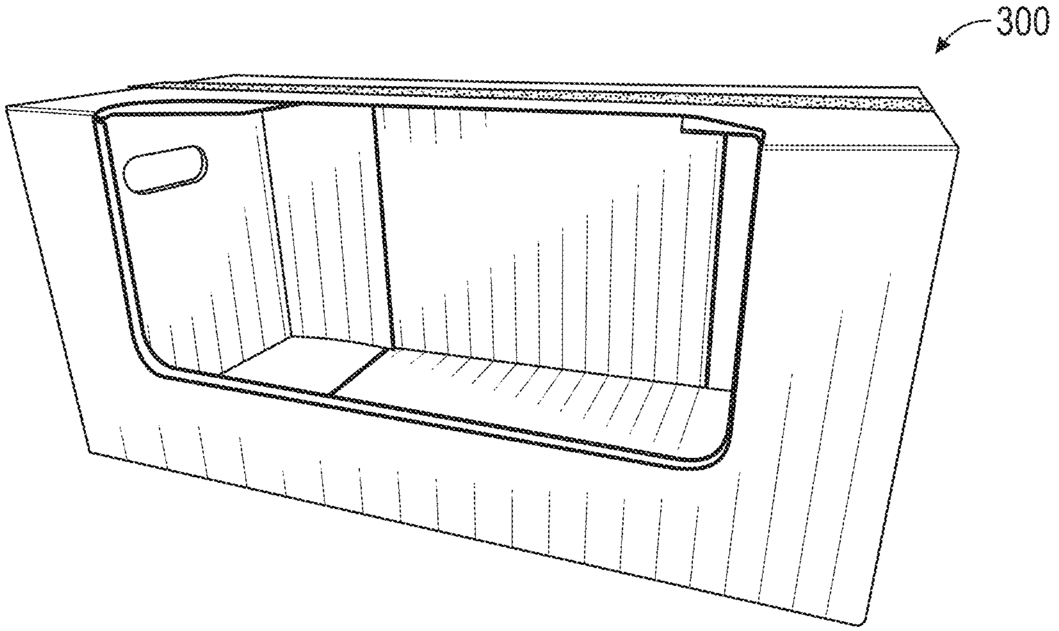

FIG. 14E illustrates the container formed by blank 300. Tape and/or other securing means can be used to secure one or more wall portions of the container. Removable portion 306*a* can comprise one or more cutouts 360 to facilitate removal of removable portion 306*a* and 316*a*, as well as the corresponding wall portions of interior portion 302 which are directly behind 306*a* (e.g., 336*a*). FIG. 14F shows these structures removed in a display-ready state.

Figure 15:
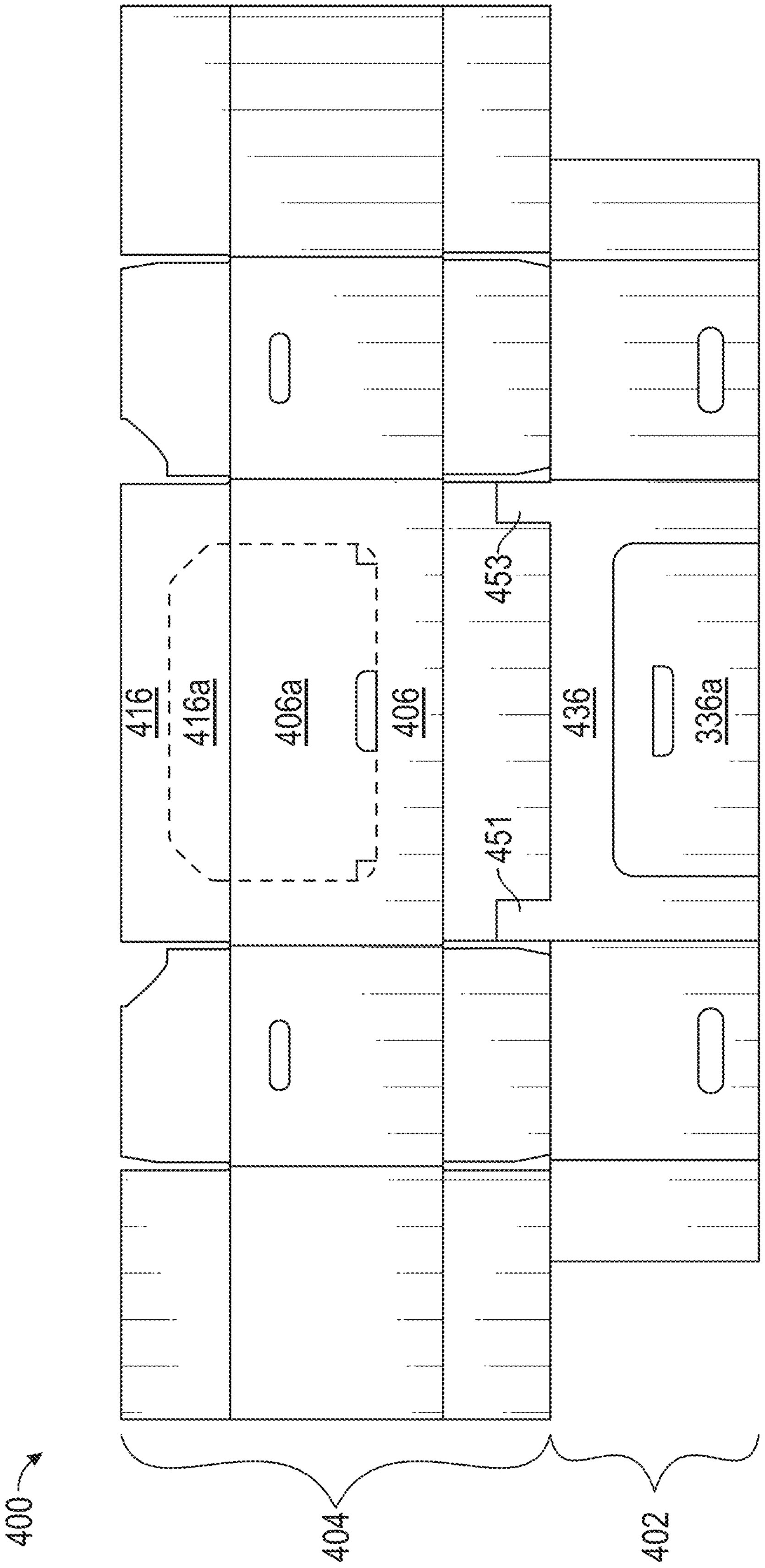
FIG. 15 illustrates a first side of an exemplary blank for constructing a container.
Figure 16:
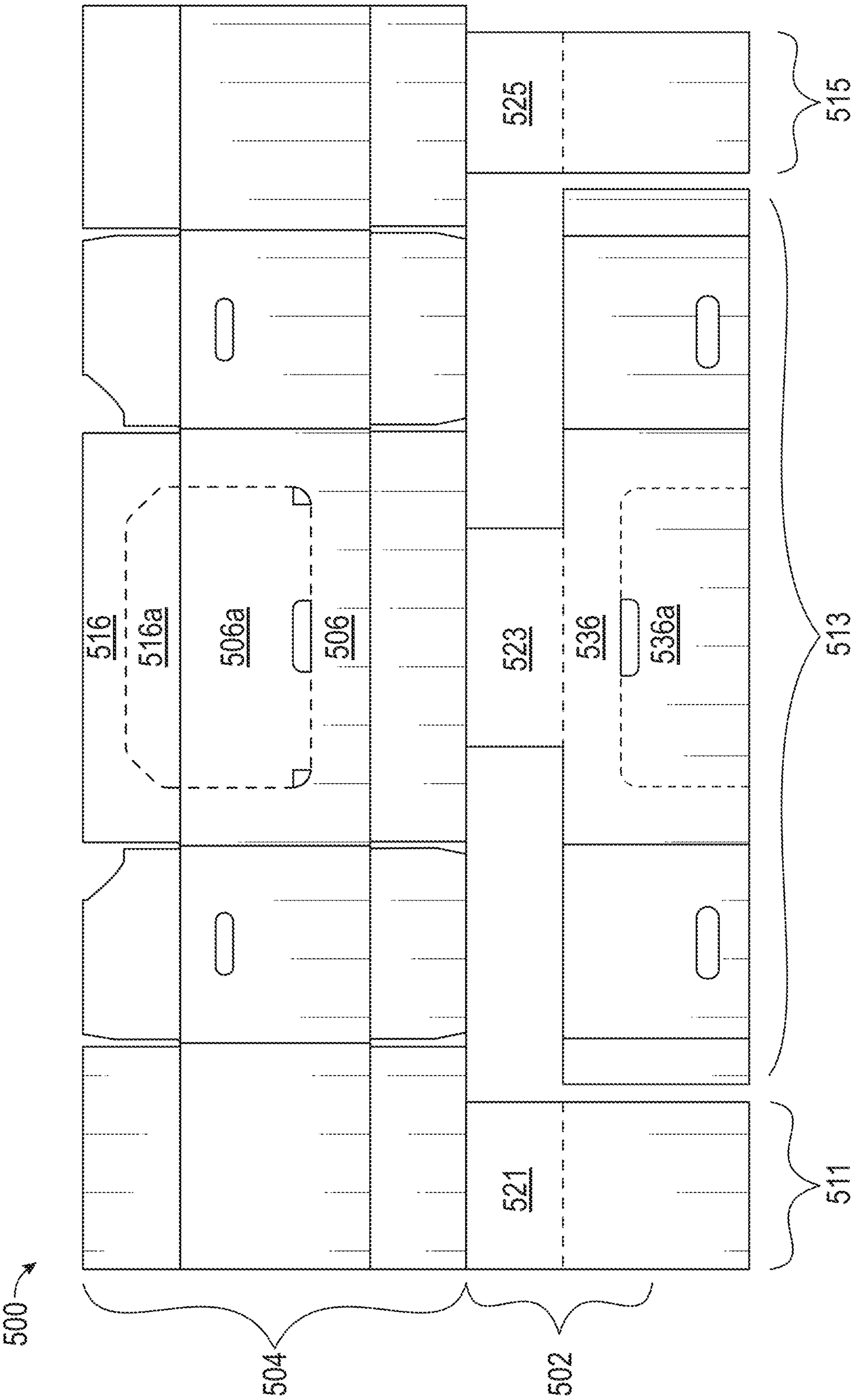
FIG. 16 illustrates a first side of an exemplary blank for constructing a container.
Figure 17:
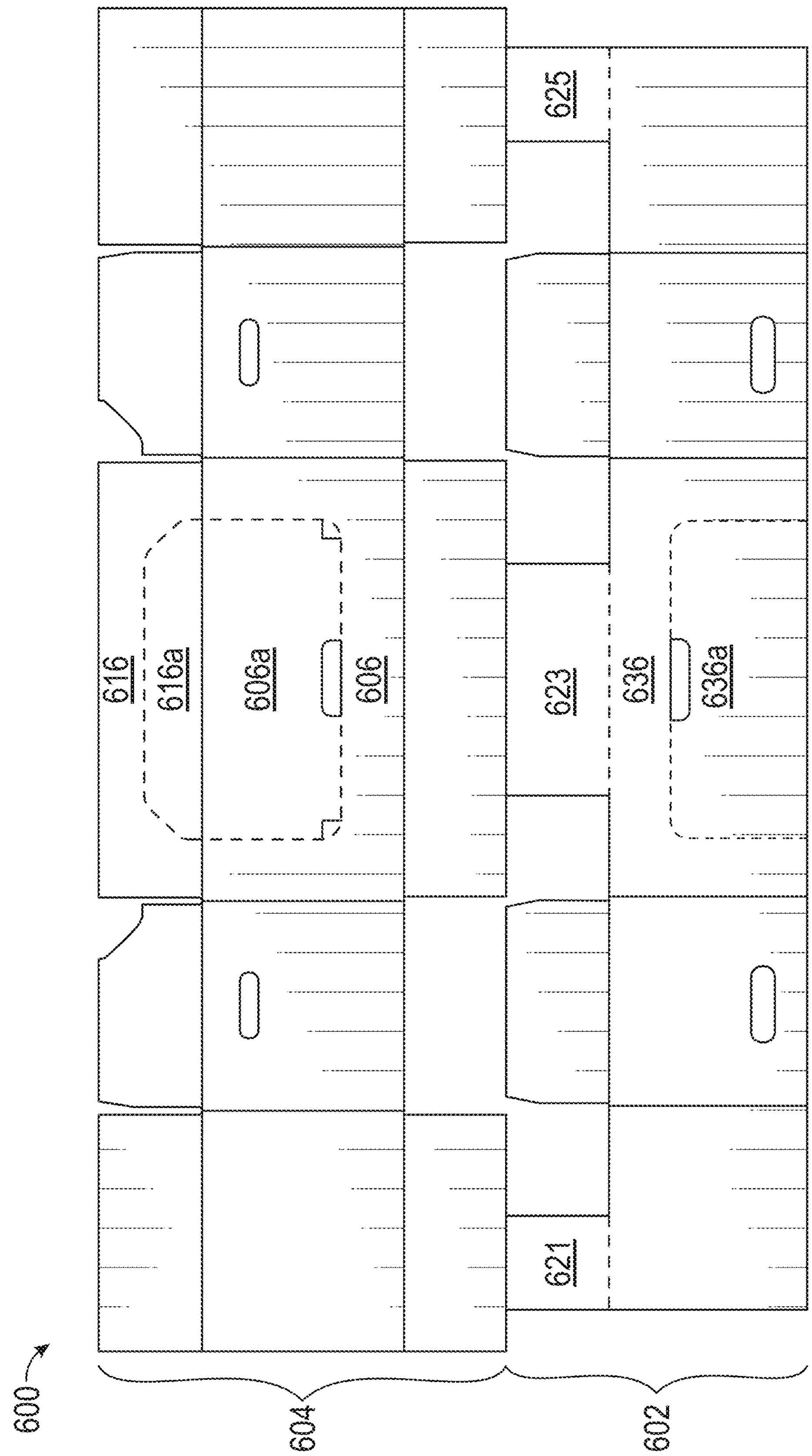
FIG. 17 illustrates a first side of an exemplary blank for constructing a container.

FIGS. 15-17 illustrate additional embodiments of exemplary blanks 400, 500, and 600 that have interior portions and exterior portions that cooperate to provide additional structural integrity as well as overlapping removable portions that readily permit conversion to a display-ready state. The removable portions are reflected in each of these embodiments using similar numbering, modified to reflect the current embodiment.

FIG. 15 illustrates a blank 400 with an interior portion 402, exterior portion 404, and removeable panels 406*a*, 416*a*, and 436*a*. Interior portion 402 is coupled to exterior portion 404 through interconnecting portions 451, 453. Blank 400 can be constructed into a container in a manner similar to the other embodiments, including by folding interior portion 402 into contact with exterior portion 404.

FIG. 16 illustrates another blank 500 with an interior portion 502, exterior portion 504, and removeable panels 506*a*, 516*a*, and 536*a*. Interior portion 502 comprises a plurality of sections 511, 513, and 515, which separately extend from the exterior portion 504 at connecting panels 521, 523, and 525. Blank 500 can be constructed into a container in a manner similar to the other embodiments, including by folding interior portion 502 into contact with exterior portion 504.

FIG. 17 illustrates another blank 600 with an interior portion 602, exterior portion 604, and removeable panels 606*a*, 616*a*, and 636*a*. Interior portion 602 is coupled to exterior portion 604 at connecting panels 621, 623, and 625. Blank 600 can be constructed into a container in a manner similar to the other embodiments, including by folding interior portion 602 into contact with exterior portion 604.

Figure 18:
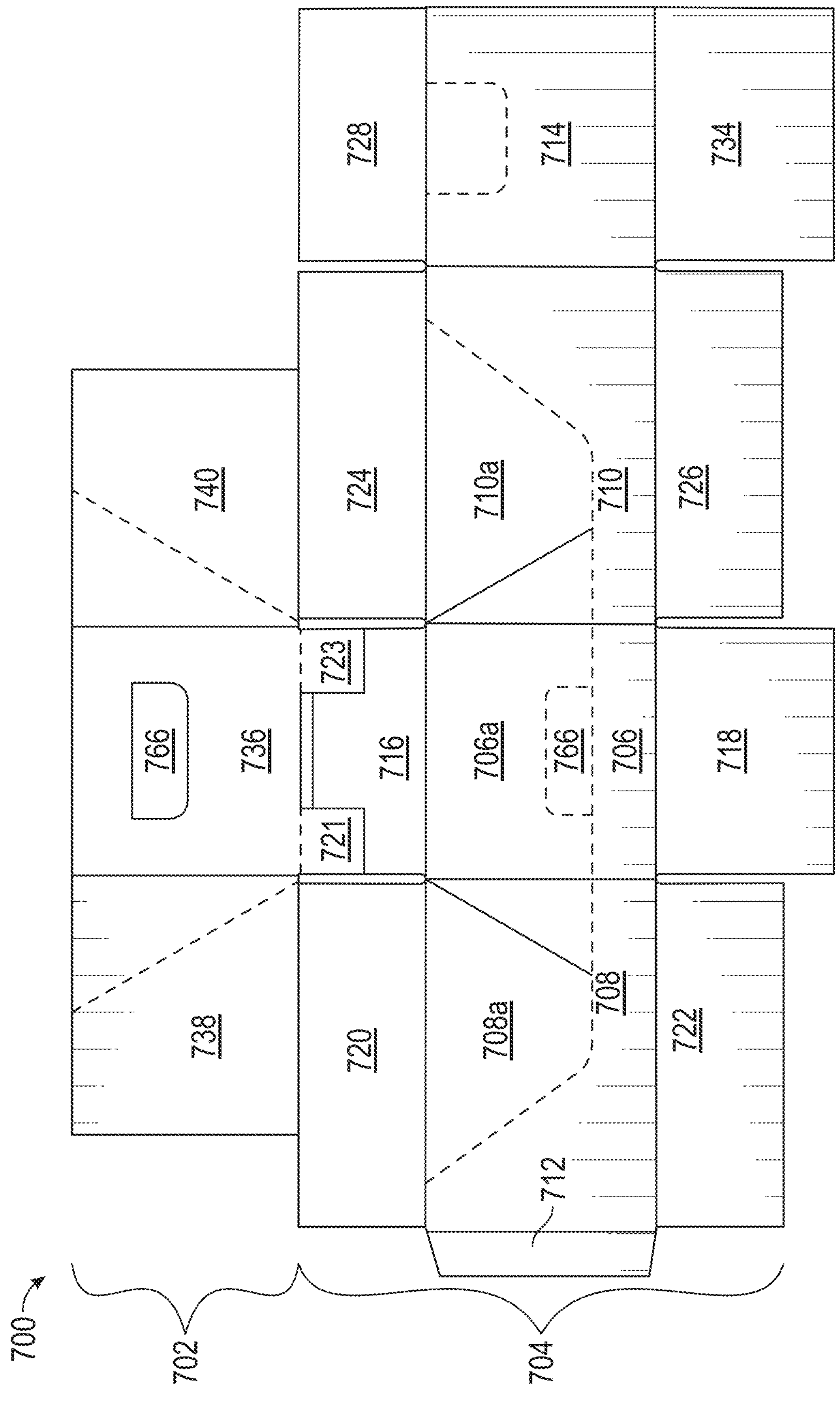
FIG. 18 illustrates a first side of an exemplary blank for constructing a container.

FIG. 18 illustrates another embodiment of an exemplary blank 700 that can be formed into a container. FIG. 18 illustrates a first side of the blank (i.e., a top side), with the second side (i.e., a bottom side) facing down. An interior portion 702 of the blank 700 is configured to form a least a portion of interior wall structure of the container and exterior portion 704 is configured to form an exterior wall structure.

Referring to FIG. 18, exterior portion 704 comprises a plurality of interconnected wall panels, including front side wall 706, right side wall 708, left side wall 710, and first rear side wall 712 and second rear side wall 714. Front side wall 706 includes a removable front panel 706*a*.

Front side wall 706, right side wall 708, left side wall 710, and first rear side wall 712 and second rear side wall 714 can be folded at the indicated fold lines to form an enclosure, along with a top and bottom wall closure. The top wall closure can be formed, collectively, by the folding of front side top wall 716, right side top wall 720, left side top wall 724, and rear side top wall 728. The bottom wall closure can be formed, collectively, by the folding of front side bottom wall 718, right side bottom wall 722, left side bottom wall 726, and rear side bottom wall 734. As shown in FIG. 18, a removable top panel 706*a* and side panels 708*a*, 710*a* can be provided.

Interior portion 702 comprises a plurality of interconnected wall panels, including front side wall 736, right side wall 738, and left side wall 740. Interior portion is foldably coupled to exterior portion at connecting panels 721, 723.

One or more adhesive portions can be applied to the interior portion and/or exterior portion to secure the interior portion to the exterior portion (see, e.g., blank 100 of FIG. 1). Additional adhesive portions, such as additional glue line, can be provided to secure other portions of the exterior portion 704 to itself and/or the interior portion 702 when formed into the container.

Figure 19A:
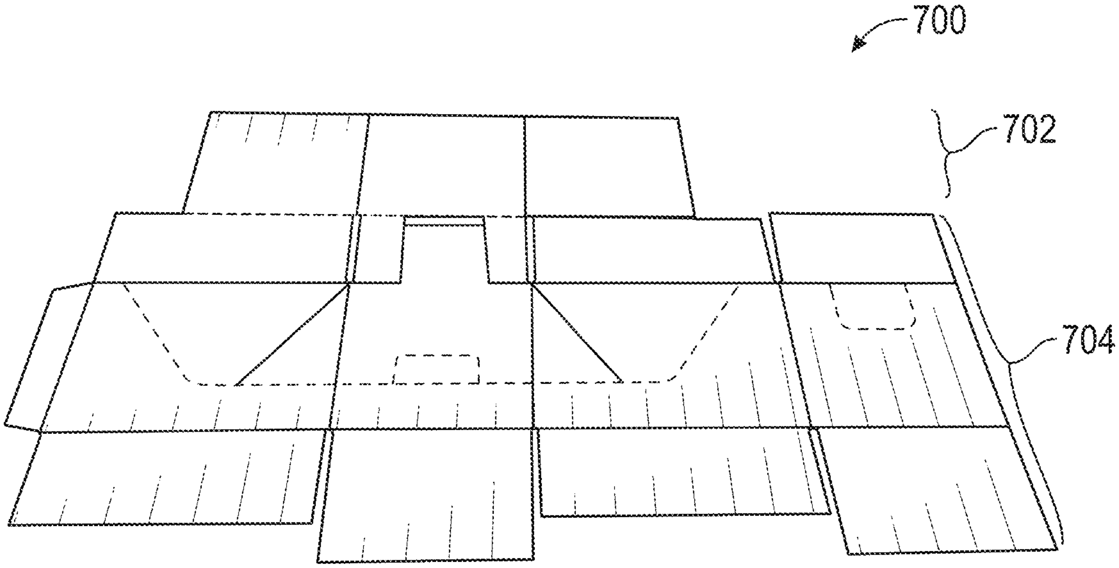
FIGS. 19A-E illustrate various stages of construction of the exemplary blank of FIG. 18 which is formed by folding and adhering an interior portion to an exterior portion to form a double-wall construction in at least some portions of the blank.
Figure 19B:
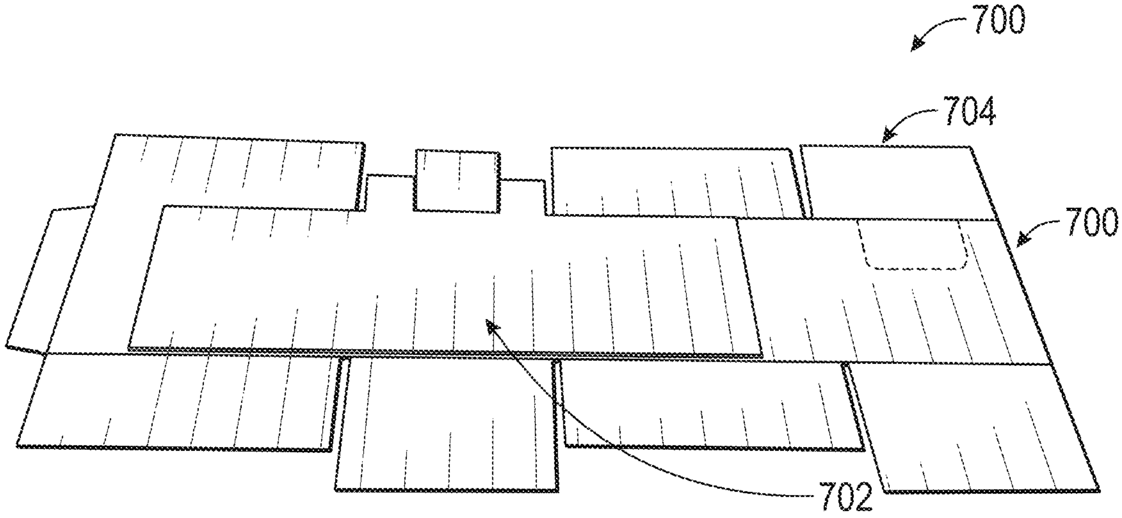

As shown in FIG. 19A, the interior portion 702 can be folded about a fold line and a surface of interior portion 702 can be secured to a facing surface of exterior portion 704. Thus, the interior portion 702 forms a second, adjacent wall structure that, in combination with the exterior side wall structures, forms a more rigid side wall structure than either the interior portion 702 or the exterior portion 704 can provide alone.

Figure 19C:
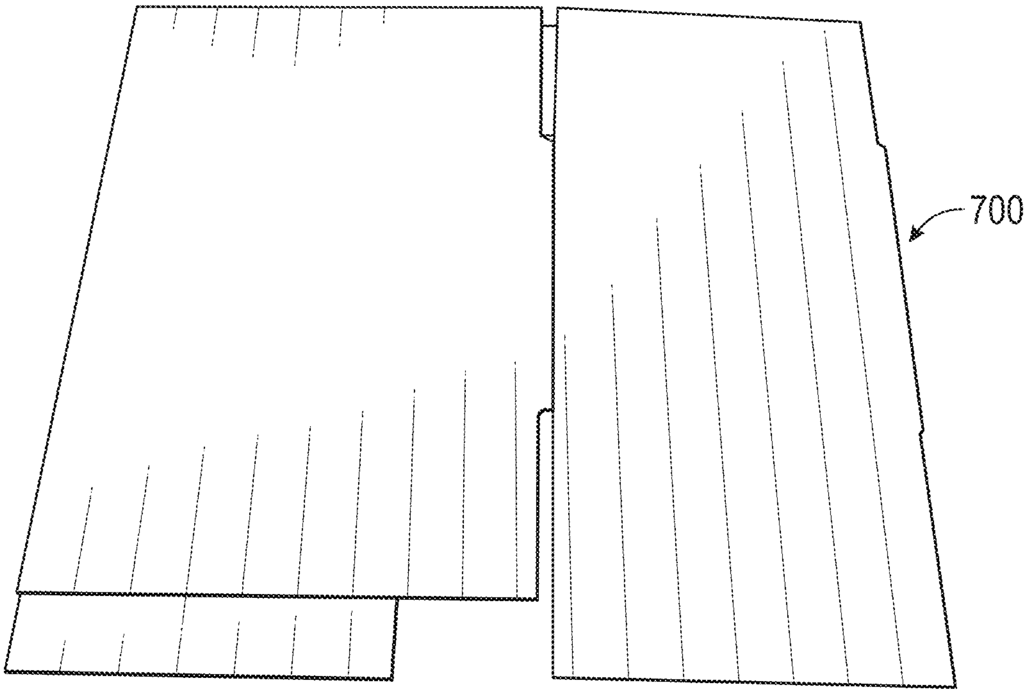

As shown in FIG. 19C, after the interior portion 702 can be folded and secured to a facing surface of exterior portion 704, the resulting structure can be folded into a KDF blank. To facilitate removal of the removable panels, one or more removable portions 766 can be provided. Removable portions 766 can be scored for removal.

As discussed in more detail below with regard to converting the constructed box (e.g., a shipping box) into a display box, the interior portion 702 is folded over the exterior portion 704 so that the removeable portions of the interior portion 702 and exterior portion 704 are aligned.

Figure 19D:
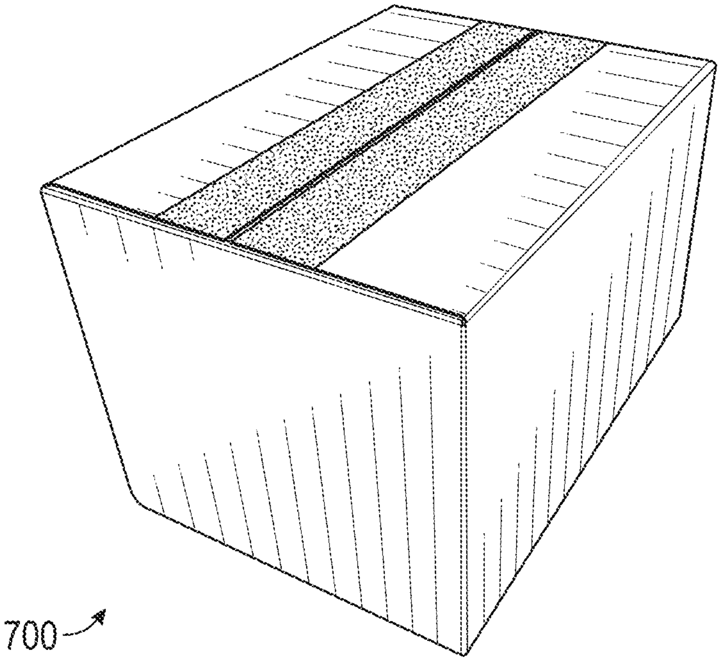
Figure 19E:
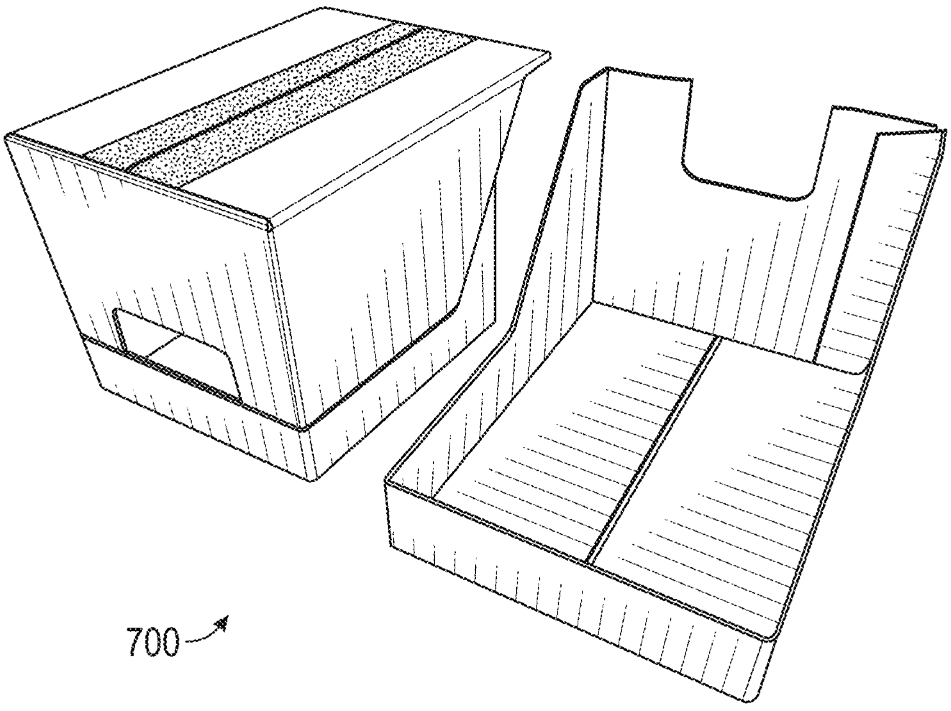

FIG. 19D illustrates the container and FIG. 19E illustrates the container converted to a display box by removing removable portions and creating an opening that extends from the front wall structure to the top wall structure.

FIGS. 20-25 illustrate additional embodiments of exemplary blanks 800, 900, 1000, 1100, 1200, and 1300 that have interior portions and exterior portions that cooperate to provide additional structural integrity as well as overlapping removable portions that readily permit conversion to a display-ready state. The removable portions are reflected in each of these embodiments using similar numbering, modified to reflect the current embodiment.

Figure 20:
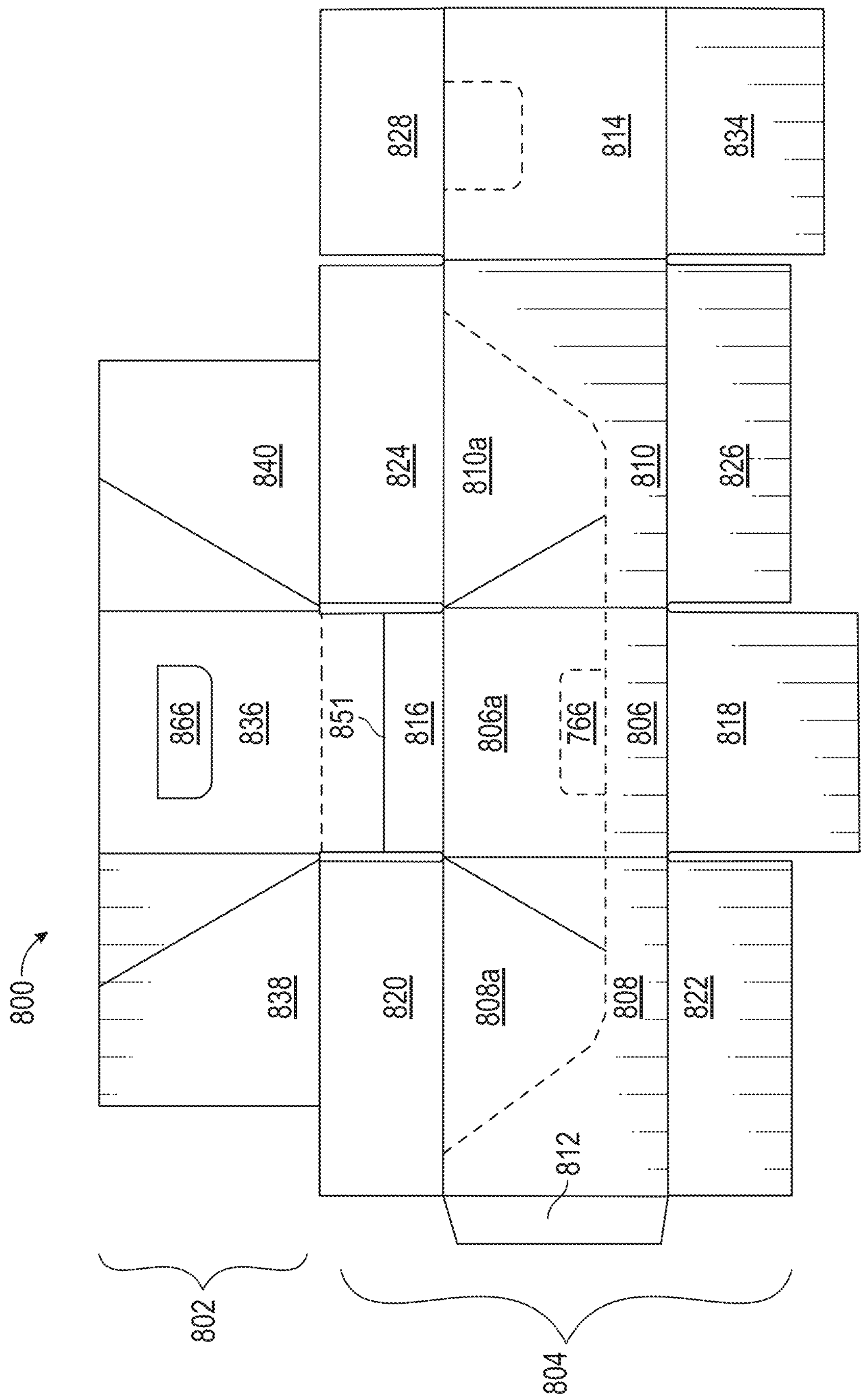
FIG. 20 illustrates a first side of an exemplary blank for constructing a container.

FIG. 20 illustrates another embodiment of an exemplary blank 800 that can be formed into a container. FIG. 20 illustrates a first side of the blank (i.e., a top side), with the second side (i.e., a bottom side) facing down. An interior portion 802 of the blank 800 is configured to form a least a portion of interior wall structure of the container and exterior portion 804 is configured to form an exterior wall structure.

Referring to FIG. 20, exterior portion 804 comprises a plurality of interconnected wall panels, including front side wall 806, right side wall 808, left side wall 810, and first rear side wall 812 and second rear side wall 814. Front side wall 806 includes a removable front panel 806*a*. Front side wall 806, right side wall 808, left side wall 810, and first rear side wall 812 and second rear side wall 814 can be folded at the indicated fold lines to form an enclosure, along with a top and bottom wall closure. The top wall closure can be formed, collectively, by the folding of front side top wall 816, right side top wall 820, left side top wall 824, and rear side top wall 828. The bottom wall closure can be formed, collectively, by the folding of front side bottom wall 818, right side bottom wall 822, left side bottom wall 826, and rear side bottom wall 834 Interior portion 802 is foldably coupled to exterior portion at a fold line 851.

Figure 21:
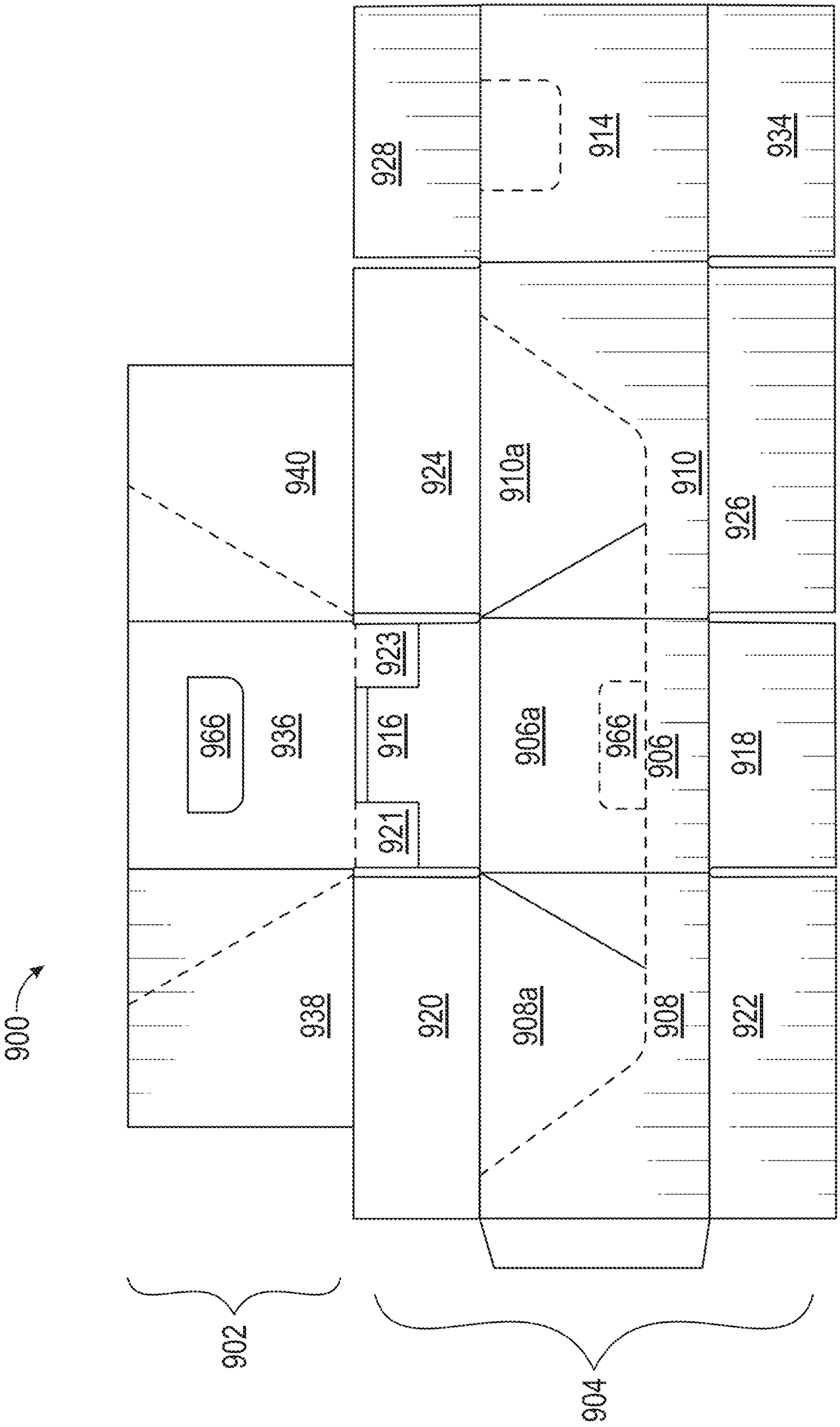
FIG. 21 illustrates a first side of an exemplary blank for constructing a container.

FIG. 21 illustrates another embodiment of an exemplary blank 900 that can be formed into a container. FIG. 21 illustrates a first side of the blank (i.e., a top side), with the second side (i.e., a bottom side) facing down. An interior portion 902 of the blank 900 is configured to form a least a portion of interior wall structure of the container and exterior portion 904 is configured to form an exterior wall structure. Blank 900 is similar to blank 700, except that bottom panels 922, 918, 926, and 934 are of equal width.

Figure 22:
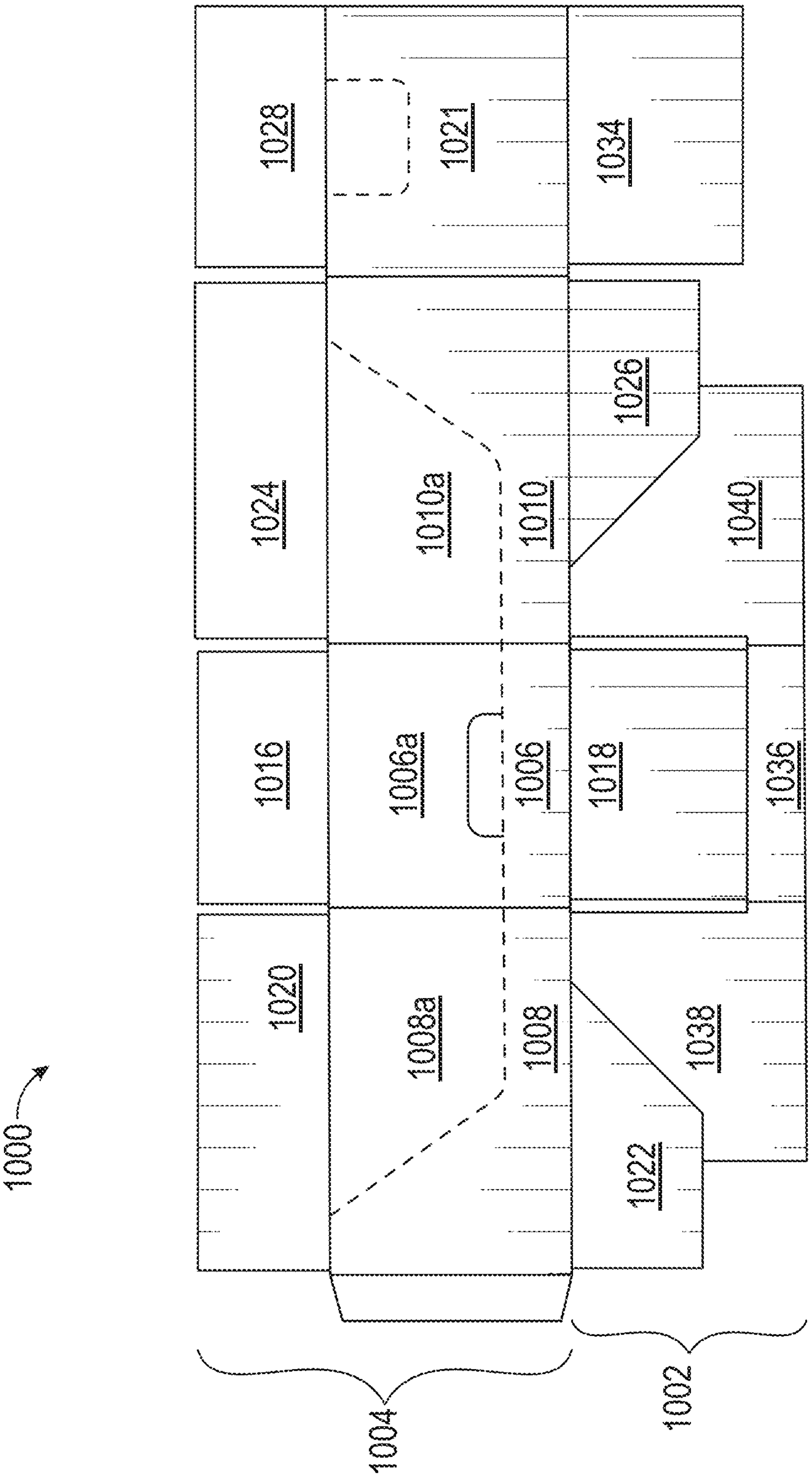
FIG. 22 illustrates a first side of an exemplary blank for constructing a container.

FIG. 22 illustrates another embodiment of an exemplary blank 1000 that can be formed into a container. FIG. 22 illustrates a first side of the blank (i.e., a top side), with the second side (i.e., a bottom side) facing down. An interior portion 1002 of the blank 1000 is configured to form a least a portion of interior wall structure of the container and exterior portion 1004 is configured to form an exterior wall structure. Interior portion 1002 includes front portion 1036 and left and right portions 1038, 1040, which can fold into position adjacent to exterior portion 1004 as described elsewhere herein.

Figure 23:
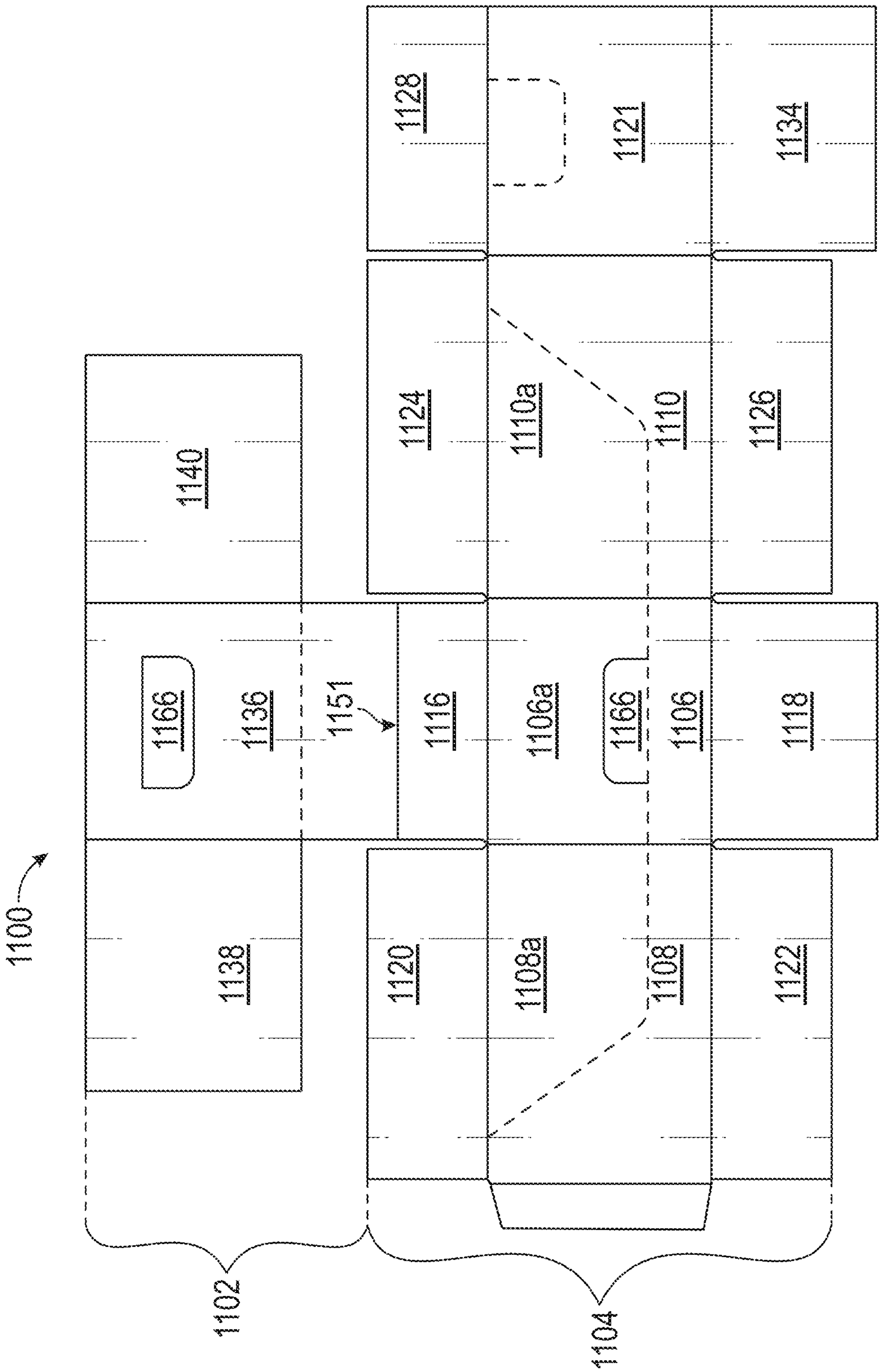
FIG. 23 illustrates a first side of an exemplary blank for constructing a container.

FIG. 23 illustrates another embodiment of an exemplary blank 1100 that can be formed into a container. FIG. 23 illustrates a first side of the blank (i.e., a top side), with the second side (i.e., a bottom side) facing down. An interior portion 1102 of the blank 1100 is configured to form a least a portion of interior wall structure of the container and exterior portion 1104 is configured to form an exterior wall structure. Interior portion 1102 includes front portion 1136 and left and right portions 1138, 1140, which can fold about fold line 1151 into position adjacent to exterior portion 1104 as described elsewhere herein.

Figure 24:
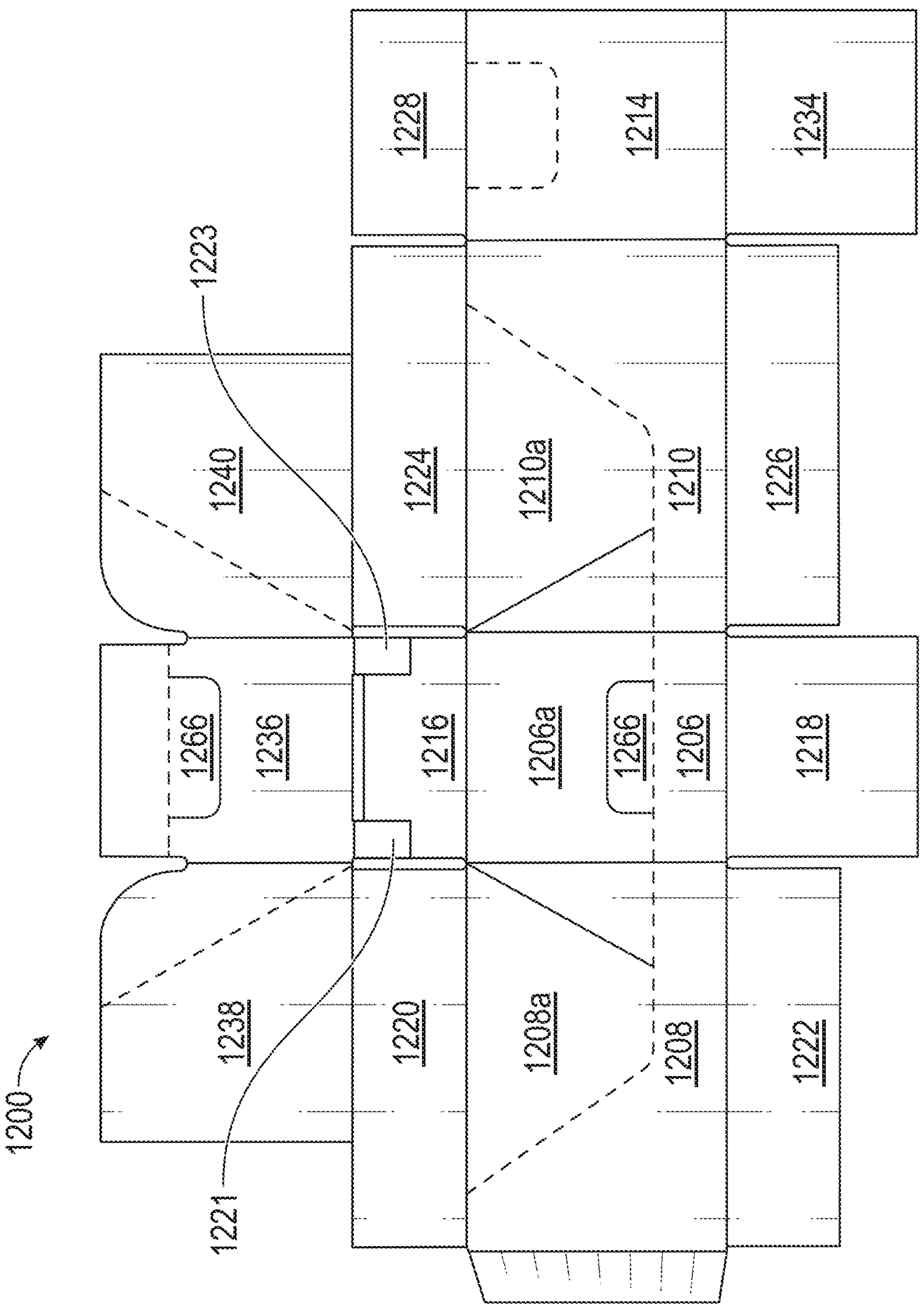
FIG. 24 illustrates a first side of an exemplary blank for constructing a container.

FIG. 24 illustrates another embodiment of an exemplary blank 1200 that can be formed into a container. FIG. 24 illustrates a first side of the blank (i.e., a top side), with the second side (i.e., a bottom side) facing down. An interior portion 1202 of the blank 1200 is configured to form a least a portion of interior wall structure of the container and exterior portion 1204 is configured to form an exterior wall structure. Interior portion 1202 includes front portion 1236 and left and right portions 1238, 1240, which are connected to the exterior portion 1204 through connecting portions 1221, 1223 and can fold into position adjacent to exterior portion 1204 as described elsewhere herein.

Figure 25:
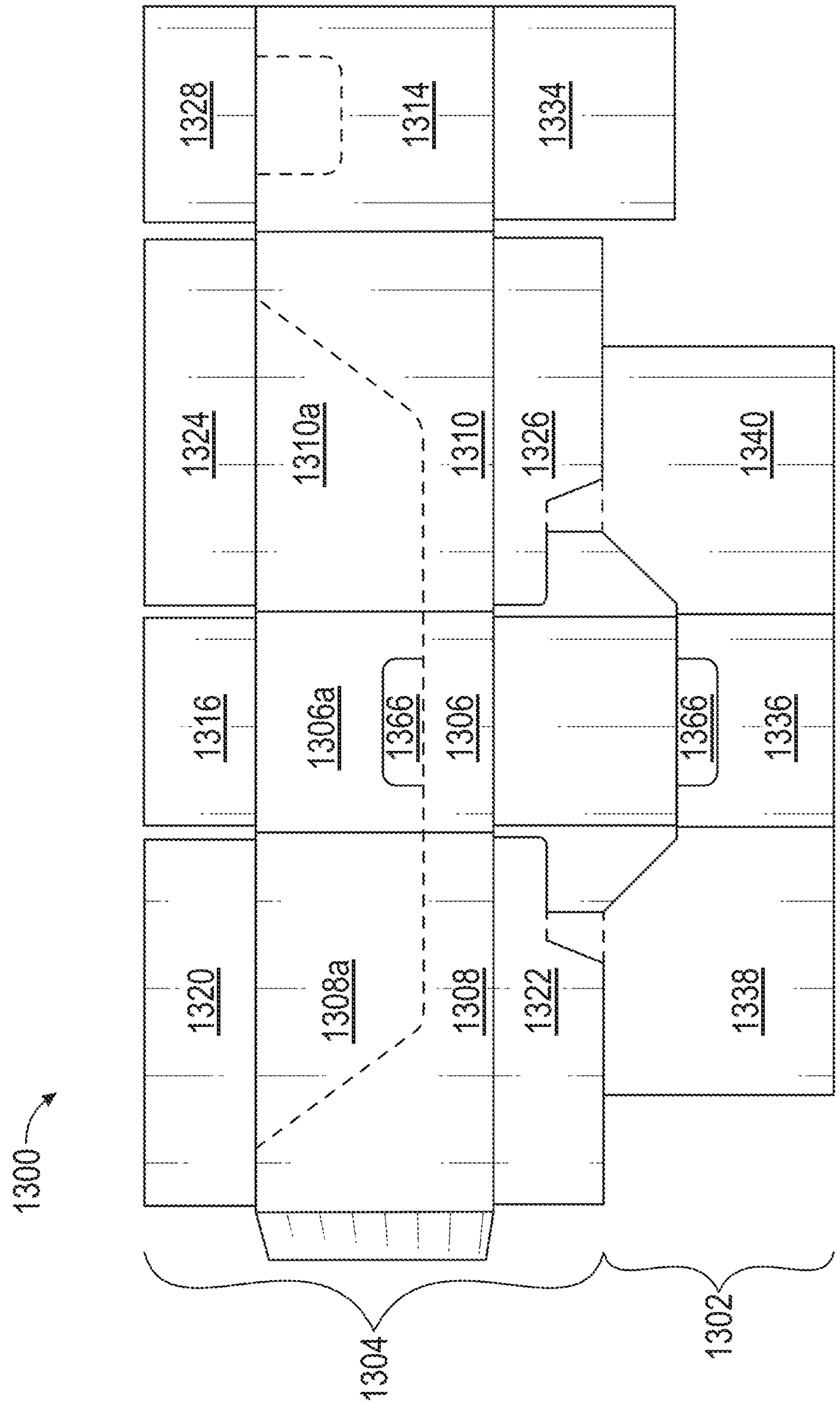
FIG. 25 illustrates a first side of an exemplary blank for constructing a container.

FIG. 25 illustrates another embodiment of an exemplary blank 1300 that can be formed into a container. FIG. 25 illustrates a first side of the blank (i.e., a top side), with the second side (i.e., a bottom side) facing down. An interior portion 1302 of the blank 1300 is configured to form a least a portion of interior wall structure of the container and exterior portion 1304 is configured to form an exterior wall structure. Interior portion 1302 includes front portion 1336 and left and right portions 1338, 1340, which can fold into position adjacent to exterior portion 1304 as described elsewhere herein.

The blanks described herein and the containers formed by these blanks can provide a number of advantages over conventional systems. These containers are formed form a single-piece blank that can function as both an enclosed shipping box while also offering improvements in display capability and structural rigidity. The improved structural rigidity can permit stacking of such containers, even when components (e.g., the removable panels described herein) are removed for the purposes of display. In addition, the double-walled construction provides wider surfaces, e.g., ledges, for improved stacking.

It should also be understood that one or more regions of the exterior and/or interior portions can include graphics and/or graphical elements. In addition, such graphics if printed on one side of the blank (e.g., the second side that is facing down) may be visible, upon construction of the container, to a user on both the exterior and interior of the container.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A corrugated paperboard box comprising:

an exterior portion comprising a first front side wall, a first rear side wall, a first left side wall, a first right side wall, a first bottom section, and a first top section;

an interior portion comprising a second front side wall, a second left side wall, and a second right side wall, wherein a plurality of outside surfaces of the interior portion are adhered to a plurality of inside surfaces of the exterior portion; and a removable section that includes a first removable portion of the exterior portion and a second removable portion of the interior portion;

wherein the second front side wall at least partially overlaps with the first front side wall, the second left side wall at least partially overlaps with the first left side wall, and the second right side wall at least partially overlaps with the first right side wall, wherein the exterior portion comprises a first plurality of cut lines that define the first removable portion, the first plurality of cut lines including a first cut line on the first front side wall, a second cut line on the first left side wall, and a third cut line on the first right side wall, wherein the interior portion comprises a second plurality of cut lines that define the second removable portion, and wherein the interior portion is hingedly coupled to the exterior portion by one or more connecting portions.

2. The corrugated paperboard box of claim 1, wherein the second plurality of cut lines are aligned with the first plurality of cut lines.

3. The corrugated paperboard box of claim 1, wherein the first removable portion comprises at least a portion of each of the first front side wall, the first left side wall, and the first right side wall of the exterior portion and the second removable portion comprises at least a portion of each of the second front side wall, the second left side wall, and the second right side wall of the interior portion.

4. The corrugated paperboard box of claim 3, wherein the first removable portion further comprises the first top section.

5. The corrugated paperboard box of claim 3, wherein the second cut line on the first left side wall, and the third cut line on the first right side wall extend horizontally at front areas of the first left side wall and first right side wall, respectively, and extend upward at an angle a rear areas of the first left side wall and first right side wall, respectively.

6. The corrugated paperboard box of claim 1, wherein the one or more connecting portions extend from the first top section.

7. The corrugated paperboard box of claim 6, wherein the one or more connecting portions is a single connecting panel that extends from the first top section.

8. The corrugated paperboard box of claim 6, wherein the one or more connecting portions are two connecting panels that extend from the first top section.

9. The corrugated paperboard box of claim 1, wherein the first bottom section of the exterior portion comprises a right side bottom wall and a left side bottom wall, and the one or more connecting portions extend from the right side bottom wall and left side bottom wall.

10. The corrugated paperboard box of claim 1, wherein the second removable portion include at least one cutout to facilitate removal of the first and second removable portions.

* * * * *